United States Patent
Taniguchi et al.

(10) Patent No.: US 7,233,233 B2
(45) Date of Patent: Jun. 19, 2007

(54) VEHICLE SURROUNDINGS MONITORING APPARATUS

(75) Inventors: Fuminori Taniguchi, Shioya-gun (JP); Nobuharu Nagaoka, Nasu-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 11/150,733

(22) Filed: Jun. 10, 2005

(65) Prior Publication Data

US 2005/0276447 A1    Dec. 15, 2005

(30) Foreign Application Priority Data

Jun. 14, 2004    (JP)    ............................. 2004-175667

(51) Int. Cl.
*G08B 21/00*    (2006.01)
(52) U.S. Cl. ...................... 340/435; 340/436; 340/903; 348/148; 348/149; 382/104
(58) Field of Classification Search ................ 340/903, 340/435, 436; 348/148, 149, 161; 382/254, 382/309, 276, 103, 104, 181
See application file for complete search history.

(56) References Cited

U.S. PATENT DOCUMENTS

2003/0076414 A1*    4/2003    Sato et al. .................. 348/148
2004/0052418 A1*    3/2004    DeLean ....................... 382/209
2004/0066970 A1*    4/2004    Matsugu ...................... 382/217
2004/0258307 A1*    12/2004    Viola et al. .................. 382/190
2005/0276447 A1*    12/2005    Taniguchi et al. ........... 382/103

FOREIGN PATENT DOCUMENTS

| JP | 11-328364 | 11/1999 |
|---|---|---|
| JP | 2000-211453 | 8/2000 |

* cited by examiner

*Primary Examiner*—Brent A. Swarthout
(74) *Attorney, Agent, or Firm*—Carrier, Blackman & Associates, P.C.; Joseph P. Carrier; William D. Blackman

(57) ABSTRACT

A vehicle surroundings monitoring apparatus recognizes a pedestrian from existence of a leg, in the case in which a width in real space of a binarized object is suitable as a pedestrian's leg, the binarized object has longwise shape, the lower end position of the binarized object exists in the lower part (lower half) of a gray scale object region, and a serial luminance transition exists in the binarized object. The vehicle surroundings monitoring apparatus also recognizes a pedestrian from existence of an umbrella held up by the pedestrian, in the case in which an umbrella region with a low temperature exists above the binarized object, the width of the umbrella region is suitable as a pedestrian's umbrella, and, the spatial correlation between the centroid position of the umbrella region and the centroid position of the binarized object is suitable as a spatial relationship between a pedestrian and his/her umbrella.

21 Claims, 11 Drawing Sheets

MATERIAL IN EACH FRAMES P1 TO P4 IS THE OBJECT

VEHICLE SURROUNDINGS MONITORING APPARATUS

BACKGROUND OF THE INVENTION

1. Field of the Invention

The present invention relates to vehicle surroundings monitoring apparatus which extracts an object by binarizing an infrared image.

Priority is claimed on Japanese Patent Application No. 2004-175667, filed Jun. 14, 2004, the content of which is incorporated herein by reference.

2. Description of Related Art

Hitherto, there is a vehicle surroundings monitoring apparatus which extracts an object, such as a pedestrian which has a possibility of coming into collision with a vehicle, from an image of the vehicle's surroundings caught by an infrared image photographing device (an infrared camera). Specifically, in this apparatus, an infrared image is subjected to a binarization process to search the region where bright parts concentrate (a binarized object), and it is judged whether the infrared object is the head of the pedestrian or not, by calculating the aspect ratio, the demand fulfillment percentage of the binarized object, and further, the distance from an actual area and the centroid position in a display. When it is judged that the binarized object is the head of a pedestrian, height of the pedestrian in the image is calculated to determine the region which covers the body of the pedestrian, and these regions are displayed with assorting them from the other regions. In this way, it is possible to perform a visual assist more effectively, by specifying the position of whole body of a pedestrian in an infrared image and displaying this information to the driver of the vehicle, for example, as is disclosed in the patent document 1 (Japanese Unexamined Patent Application, First Publication No. H11-328364).

Moreover, in some vehicle surroundings monitoring apparatus, the pedestrian detection alarm is suppressed, when the weather of the surroundings of vehicles is rain and the pedestrian may hide in a rain gear, such as an umbrella. Specifically, in the case in which a pedestrian detection is performed using an infrared sensor, the detection accuracy may deteriorate because a pedestrian hides behind a rain gear such as an umbrella, thereby preventing the body temperature from being detected on a rainy day, in addition to the fact that the infrared sensor may detect the heat of asphalt and buildings. Therefore, it is proposed to stop outputting of the pedestrian detection alarm by detecting that the amount of rainfall is more than a predetermined amount, that is, such an amount that the pedestrian necessitates rain gear such as an umbrella and that the pedestrian may hide behind the rain gear, and informing the driver that the detecting accuracy of pedestrian deteriorates, for example, as is disclosed in the patent document 2 (Japanese Unexamined Patent Application, First Publication No. 2000-211453). Thereby, an unsuitable pedestrian detection alarm can be suppressed in the case in which the weather of the surroundings of vehicles is rain.

As mentioned above, comparative distinguishable physical features of a pedestrian who is present on a road, such as a pedestrian's head, cannot always be caught by an infrared camera. For example, as shown in FIG. 13 which shows an infrared image (gray scale image) which caught the pedestrian who used an umbrella, when the pedestrian holds an umbrella deeply (portion marked with a white circle in FIG. 13) such that the pedestrian's head is hidden, and there is a problem that recognition of the pedestrian may become difficult.

Therefore, in order to perform more effective visual assistance to a vehicle driver, it is necessary to improve the recognition percentage of a pedestrian by performing extraction of a pedestrian using not only comparative distinguishable physical features of a pedestrian such as judging based on stature, the head and the trunk of the body, and on the head only, as in the apparatus disclosed in the patent document 1, but also features other than the comparative distinguishable physical features of a pedestrian.

Moreover, even if the weather of the surroundings of a vehicle includes rain, when a pedestrian is present in the surroundings of the vehicle, it is still necessary to detect positively the pedestrian and to output an alarm so as to excite a vehicle driver's attention, unlike the apparatus disclosed in the patent document 2.

SUMMARY OF THE INVENTION

The present invention was made in view of the above problems, and it is an object of the present invention to provide vehicle surroundings monitoring apparatus which can judge precisely an indeterminate binarized object extracted from an infrared image, and which can recognize a pedestrian stably.

In order to solve the above problems, a first aspect of the present invention provides a vehicle surroundings monitoring apparatus which extracts an object of the surroundings of the vehicle (for example, one's own car 10 in embodiment mentioned later) using a gray scale image photographed by an infrared image photographing device (for example, infrared cameras 2R and 2L of the embodiment mentioned later), including: a pedestrian leg characteristic value storing device (for example, the pedestrian leg characteristic value storing device of an image-processing unit 1 in the embodiment mentioned later) for storing a characteristic value of a leg of a pedestrian, a binarized object extracting device for extracting a binarized object by binarizing the gray scale image (for example, processing in the steps S4 to S7 performed by the image-processing unit 1 in the embodiment mentioned later), a leg judging device for judging whether the binarized object is the leg of the pedestrian or not, by comparing the characteristic value of the binarized object extracted by the binarized object extracting device with the characteristic value of a leg of a pedestrian (for example, processing of the steps S41 to S44 performed by the image-processing unit 1 in the embodiment mentioned later), and a pedestrian recognizing device (for example, processing of the step S45 performed by the image-processing unit 1 in the embodiment mentioned later) for recognizing the object including the binarized object as a pedestrian when the binarized object is recognized as a leg of a pedestrian by the leg judging device.

In the vehicle surroundings monitoring apparatus having the above constitution, a binarized object is extracted by the binarized object extracting device from the gray scale image photographed by the infrared photographing device, and the characteristic value of the extracted binarized object is compared with the characteristic value of the leg of a pedestrian which is stored in the pedestrian leg characteristic value storing device, whereby the leg judging device judges whether the binarized object is the leg of the pedestrian or not. When the leg judging device judges that it is the leg of the pedestrian, the pedestrian recognizing device recognizes the object including the binarized object as a pedestrian, and as a result, it is possible to recognize a pedestrian who is in the surroundings of the vehicle from the existence of the leg of the pedestrian photographed by the infrared photographing device.

A second aspect of the present invention provides a vehicle surroundings monitoring apparatus which extracts an object of the surroundings of the vehicle (for example, one's own car 10 in the embodiment mentioned later) using a gray scale image photographed by an infrared image photographing device (for example, the infrared cameras 2R and 2L in the embodiment mentioned later), including: an umbrella characteristic value storing device for storing a characteristic value of an umbrella in a state held by a pedestrian (for example, the umbrella characteristic value storing device of the image-processing unit 1 in the embodiment mentioned later), a binarized object extracting device for extracting a binarized object by binarizing the gray scale image (for example, processing of the steps S4 to S7 performed by the image-processing unit 1 in the embodiment mentioned later), a perimeter region calculating device for calculating a perimeter region on the gray scale image of the binarized object extracted by the binarized object extracting device (for example, processing of the step S46 which the image-processing unit 1 of the embodiment mentioned later performs), a search region setting device for setting a search region between an upper end of the perimeter region calculated by the perimeter region calculating device and the binarized object (for example, processing of the step S46 performed by the image-processing unit 1 to obtain a gray scale object region 101 in the embodiment mentioned later), an umbrella judging device for judging whether the umbrella is present or not in the search region, by comparing a characteristic value of the search region set by the search region setting device with the characteristic value of the umbrella in a state held by a pedestrian (for example, processing of the steps S47 to S49 performed by the image-processing unit 1 in the embodiment mentioned later), and a pedestrian recognizing device for recognizing the object including the binarized object as a pedestrian when it is recognized that the umbrella held by a pedestrian is present in the search region by the umbrella judging device (for example, processing of the step S45 performed by the image-processing unit 1 in the embodiment mentioned later).

In the vehicle surroundings monitoring apparatus equipped with the above constitution, the perimeter region on the gray scale image of the binarized object is calculated by the perimeter region calculating device, while extracting the binarized object from the gray scale image photographed by the infrared photographing device by the binarized object extracting device, and further the search region is set by the search region setting device between the upper end of the perimeter region calculated by the perimeter calculating device and the binarized object. And the characteristic value of the set search region is compared with the characteristic value of the umbrella held by a pedestrian stored in the umbrella characteristic value storing device, such that the umbrella judging device judges whether the umbrella held by a pedestrian is present or not within the search region. When the umbrella judging device judges that the umbrella held by a pedestrian is present within the search region, the pedestrian recognizing device recognizes the object including the binarized object as a pedestrian, and as a result, it is possible to recognize the pedestrian who is present in the vehicle surroundings, from the existence of the umbrella held by a pedestrian which is photographed by the infrared photographing device.

A third aspect of the present invention provides a vehicle surroundings monitoring apparatus according to the first aspect of the present invention, further including a perimeter region calculating device (for example, the processing to obtain the gray scale object region 101 in the processing of step S46 which is performed by the image-processing unit 1 of the embodiment mentioned later) for calculating a perimeter region on the gray scale image of the binarized object extracted by the binarized object extracting device, wherein the leg judging device judges that the binarized object is the leg of a pedestrian when the width of the binarized object is within a predetermined range, an aspect ratio of the binarized object is not less than a predetermined threshold, and the binarized object is present within the perimeter region of a predetermined range from a lower end of the perimeter region.

In the vehicle surroundings monitoring apparatus equipped with the above constitution, the perimeter calculating device calculates the perimeter region on the gray scale image of the binarized object which is extracted by the binarized object extracting device. The leg judging device judges that the binarized object is the leg of a pedestrian, when the width of the binarized object is within a predetermined range, the aspect ratio of the binarized object is not less than a predetermined aspect threshold, and the binarized object is present within the perimeter region which is a predetermined range from the bottom end of the perimeter region, and as a result, it is possible to judge the presence of a pedestrian by judging whether the binarized object has a proper width as the leg of a pedestrian, whether the binarized object has a proper longwise shape of as the leg of a pedestrian, and further whether the binarized object is present at a lower part of the perimeter region or not.

A fourth aspect of the present invention provides a vehicle surroundings monitoring apparatus according to the third aspect of the present invention, further including a luminance change detecting device (for example, the processing of the step S44 which is performed by the image-processing unit 1 of the embodiment mentioned later) for detecting whether a time series luminance change of the binarized object extracted by the binarized object extracting device is present or not, wherein the leg judging device judges that the binarized object is the leg of a pedestrian when the time series luminance change of the binarized object is detected by the luminance change detecting device.

In the vehicle surroundings monitoring apparatus equipped with the above constitution, when the luminance change detecting device detects a time series luminance change, the leg judging device judges that the binarized object is the leg of a pedestrian, as a result, it is possible to judge whether the object is a pedestrian or not by detecting a time series luminance change caused by walking of a pedestrian.

A fifth aspect of the present invention provides a vehicle surroundings monitoring apparatus according to the fourth aspect of the present invention, including: an umbrella characteristic value storing device (for example, the umbrella characteristic value storing device disposed to the image-processing unit 1 of the embodiment mentioned later) for storing a characteristic value of an umbrella in a state held by a pedestrian, a search region setting device (for example, the processing of step S46 which is performed by the image-processing unit 1 of the embodiment mentioned later) for setting a search region between the upper end of the perimeter region and the binarized object on the gray scale image of the binarized object in which a time series luminance change of the binarized object is not detected by the luminance change detecting device, and an umbrella judging device (for example, processing of steps S47 to S49 which are performed by the image-processing unit 1 of the embodiment mentioned later) for judging whether the umbrella is present or not within the search region by comparing the characteristic value of the search region set by the search region setting device with the characteristic value of the umbrella in a state held by a pedestrian, wherein the pedestrian recognizing device recognizes the object which includes the binarized object as a pedestrian, when the binarized object is judged to be a leg of the pedestrian by the leg judging device, or when the umbrella held by a pedestrian is judged to be present within the search region by the umbrella judging device.

In the vehicle surroundings monitoring apparatus equipped with the above constitution, by the search region setting device, the search region is set between the upper end of the perimeter region on the gray scale of the binarized object in which a time series luminance change is not detected by the luminance change detecting device and the binarized object.

By comparing the characteristic value of the set search region with the characteristic value of the umbrella held by a pedestrian stored in the umbrella characteristic value storing device, the umbrella judging device judges whether the umbrella held by a pedestrian is present within the search region, and when the umbrella judging device judges that the umbrella held by a pedestrian is present within the search region, the pedestrian recognizing device can recognize the object as a pedestrian, even if the object includes the binarized object in which a time series luminance change is not detected.

A sixth aspect of the present invention provides a vehicle surroundings monitoring apparatus according to the second aspect or the fifth aspect of the present invention, including: two of the infrared photographing devices, a distance calculating device (for example, the processing of the step S46 which is performed by the image-processing unit 1 of the embodiment mentioned later) for calculating distance to the binarized object included in the gray scale image, using two gray scale images photographed by the two infrared photographing devices, a subsearch region setting device for setting subsearch regions to the left and the right of the search region, respectively, an integrated search region setting device (for example, processing of the step S46 which is performed by the image-processing unit 1 of the embodiment mentioned later) for setting an integrated search region, in which the search region and at least one of the subsearch regions are integrated, when the distance to the binarized object included in the search region is identical with the distance to the binarized object included in the subsearch regions, a width measuring device (for example, the processing of the step S48 which is performed by the image-processing unit 1 of the embodiment mentioned later) for measuring width of the integrated search region set by the integrated search region setting device, and an average luminance calculating device (for example, the processing of the step S47 which is performed by the image-processing unit 1 of the embodiment mentioned later) for calculating an average luminance of the integrated search region set by the integrated search region setting device, wherein the umbrella judging device judges that the umbrella is present within the search region, when the width of the integrated search region is within a predetermined range and the average luminance of the integrated search region is not more than a predetermined luminance threshold.

In the vehicle surroundings monitoring apparatus equipped with the above constitution, the subsearch region setting device sets the subsearch region on the right side and the left side of the search region, and the integrated search region setting device sets the integrated search region in which the search region and at least one of the subsearch regions are integrated, when the distance from the binarized object which is contained in the search region is identical with the distance from the binarized object which is contained in the subsearch regions, which are calculated by the distance calculating device. And the umbrella judging device judges that the umbrella is present within the search region, when the width of the integrated search region, which is measured by the width measuring device, is within a predetermined range, and the average luminance of the integrated search region, which is measured by the average luminance calculating device, is not less than a predetermined luminance threshold, and as a result, it is possible to judge whether a pedestrian is present or not by judging whether the binarized object contained in the integrated search region has a proper width and a proper average luminance as the umbrella held by a pedestrian.

A seventh aspect of the present invention provides a vehicle surroundings monitoring apparatus according to the sixth aspect of the present invention, further including: a binarized object centroid position calculating device (for example, the processing of step S49 which is performed by the image-processing unit 1 of the embodiment mentioned later) for calculating a centroid position of the binarized object extracted by the binarized object extracting device, and a region centroid position calculating device (for example, the processing of step S49 which is performed by the image-processing unit 1 of the embodiment mentioned later) for calculating a centroid position of the integrated search region set by the integrated search region setting device, wherein the umbrella judging device judges that the umbrella is present within the search region, when the width of the integrated search region is within a predetermined range, and the average luminance of the integrated search region is not more than a predetermined luminance threshold, and further difference of position in transverse direction between the centroid of the binarized object and the centroid of the integrated search region is not more than a predetermined distance threshold.

In the vehicle surroundings monitoring apparatus equipped with the above constitution, the umbrella judging device judges that the umbrella is present within the search region, when the width of the integrated search region which is measured by the width measuring device is within a predetermined range, and the average luminance of the integrated search region which is measured by the average luminance measuring device is not more than a predetermined luminance threshold, and further difference of position in transverse direction between the centroid of the binarized object and the centroid of the integrated search region is not more than a predetermined distance threshold, and as a result, it is possible to judge whether a pedestrian is present or not, by judging whether the integrated search region has a proper width and a proper average luminance as the umbrella held by a pedestrian and whether the special correlation between the centroid position of the binarized object which is thought to be a pedestrian and the centroid position of the integrated search region which is thought to be a range of the umbrella held by a pedestrian is proper or not.

An eighth aspect of the present invention provides a vehicle surroundings monitoring apparatus according to any one of the first aspect to the fifth aspect of the present invention, further including a rainy weather detecting device (for example, the wiper operation state detecting device or the raindrop sensor which is disposed to the one's own car 10 in the embodiment mentioned later) for detecting rainfall state of the vehicle surroundings, wherein the pedestrian recognizing device performs a processing of recognizing a pedestrian from existence of the leg of a pedestrian or the umbrella held by a pedestrian in the gray scale image only when rainfall in the vehicle surroundings is detected by the rainy weather detecting device.

In the vehicle surroundings monitoring apparatus equipped with the above constitution, the rainfall state of the vehicle surroundings is detected by the rainy weather detecting device, such that the processing in which the pedestrian recognizing device recognizes the leg of a pedestrian in the gray scale image or a pedestrian from the presence of the umbrella held by a pedestrian, only when rainfall in the vehicle surroundings is detected, and as a result, it is possible to recognize a pedestrian from the characteristics of a pedestrian only when the vehicle surroundings includes rainy weather.

A ninth aspect of the present invention provides a vehicle surroundings monitoring apparatus according to any one of the first aspect to the fifth aspect of the present invention, further including an alarm outputting device (for example, the processing of steps S19 and S20 which are performed by the image-processing unit 1 of the embodiment mentioned later) for outputting an alarm about a pedestrian when the pedestrian recognizing device recognizes the object including the binarized object as a pedestrian.

In the vehicle surroundings monitoring apparatus equipped with the above constitution, the alarm outputting device outputs an alarm about a pedestrian when the pedestrian recognizing device recognizes the object including the binarized object as a pedestrian, and as a result, it is possible to output alarm only regarding the object which is recognized as a pedestrian.

A tenth aspect of the present invention provides a vehicle surroundings monitoring apparatus according to the ninth aspect of the present invention, further including a displaying device (for example, image displaying device 7 of the embodiment mentioned later) for displaying the surroundings of a vehicle photographed by the infrared photographing device, wherein the alarm outputting device displays the object which is recognized as a pedestrian by the pedestrian recognizing device and the object which is not recognized as a pedestrian by the pedestrian recognizing device distinguishably from each other on the displaying device.

In the vehicle surroundings monitoring apparatus equipped with the above constitution, the alarm outputting device displays the object which is recognized as a pedestrian by the pedestrian recognizing device and the object which is not recognized as a pedestrian by the pedestrian recognizing device, distinguishably from each other on the displaying device, and as a result, it is possible to emphasize the object which is recognized as a pedestrian.

An eleventh aspect of the present invention a vehicle surroundings monitoring apparatus according to the tenth aspect of the present invention, wherein the alarm outputting device outputs an audible warning while displaying the object which is recognized as a pedestrian by the pedestrian recognizing device and the object which is not recognized as a pedestrian by the pedestrian recognizing device distinguishably from each other on the displaying device.

In the vehicle surroundings monitoring apparatus equipped with the above constitution, the alarm outputting device displays the object which is recognized as a pedestrian by the pedestrian recognizing device and the object which is not recognized as a pedestrian by the pedestrian recognizing device, distinguishably from each other on the displaying device, and further the alarm outputting device outputs an audible warning, and as a result, it is possible to emphasize the object which is recognized as a pedestrian, while informing the vehicle driver of objects in the surroundings.

A twelfth aspect of the present invention provides a vehicle surroundings monitoring apparatus according to the tenth aspect of the present invention, further including an alarm judging device (for example, the processing of step S18 which is performed by the image-processing unit 1 of the embodiment mentioned later) for judging whether a pedestrian is a subject to which alarm should be outputted or not, when the pedestrian recognizing device recognizes the object including the binarized object as a pedestrian, wherein the alarm outputting device displays the object which is judged to be a pedestrian to which alarm should be outputted by the alarm judging device and the object which is not judged to be a pedestrian to which alarm should be outputted by the alarm judging device, distinguishably from each other on the displaying device.

In the vehicle surroundings monitoring apparatus equipped with the above constitution, the alarm judging device judges whether a pedestrian is a subject to which alarm should be outputted or not, when the pedestrian recognizing device recognizes the object which includes the binarized object as a pedestrian, and the alarm outputting device displays the object which is judged to be a pedestrian to which alarm should be outputted by the alarm judging device, and the object which is not judged to be a pedestrian to which alarm should be outputted by the alarm judging device, on the displaying device distinguishably from each other, and as a result, it is possible to emphasize only the object which is judged to be a pedestrian to which alarm should be outputted.

A thirteenth aspect of the present invention provides a vehicle surroundings monitoring apparatus according to any one of the tenth aspect to the twelfth aspect of the present invention, wherein the alarm outputting device intensively displays the object which is recognized as a pedestrian by the pedestrian recognizing device when the alarm outputting device displays the object distinguishably on the displaying device.

In the vehicle surroundings monitoring apparatus equipped with the above constitution, the alarm outputting device intensively displays the object which is recognized as a pedestrian by the pedestrian recognizing device, and as a result it is possible to judge easily the object which should be emphasized.

DETAILED DESCRIPTION OF THE INVENTION

Hereafter, referring to drawings, embodiments of the present invention will be explained.

Embodiments (Whole Constitution)

Figure 1:
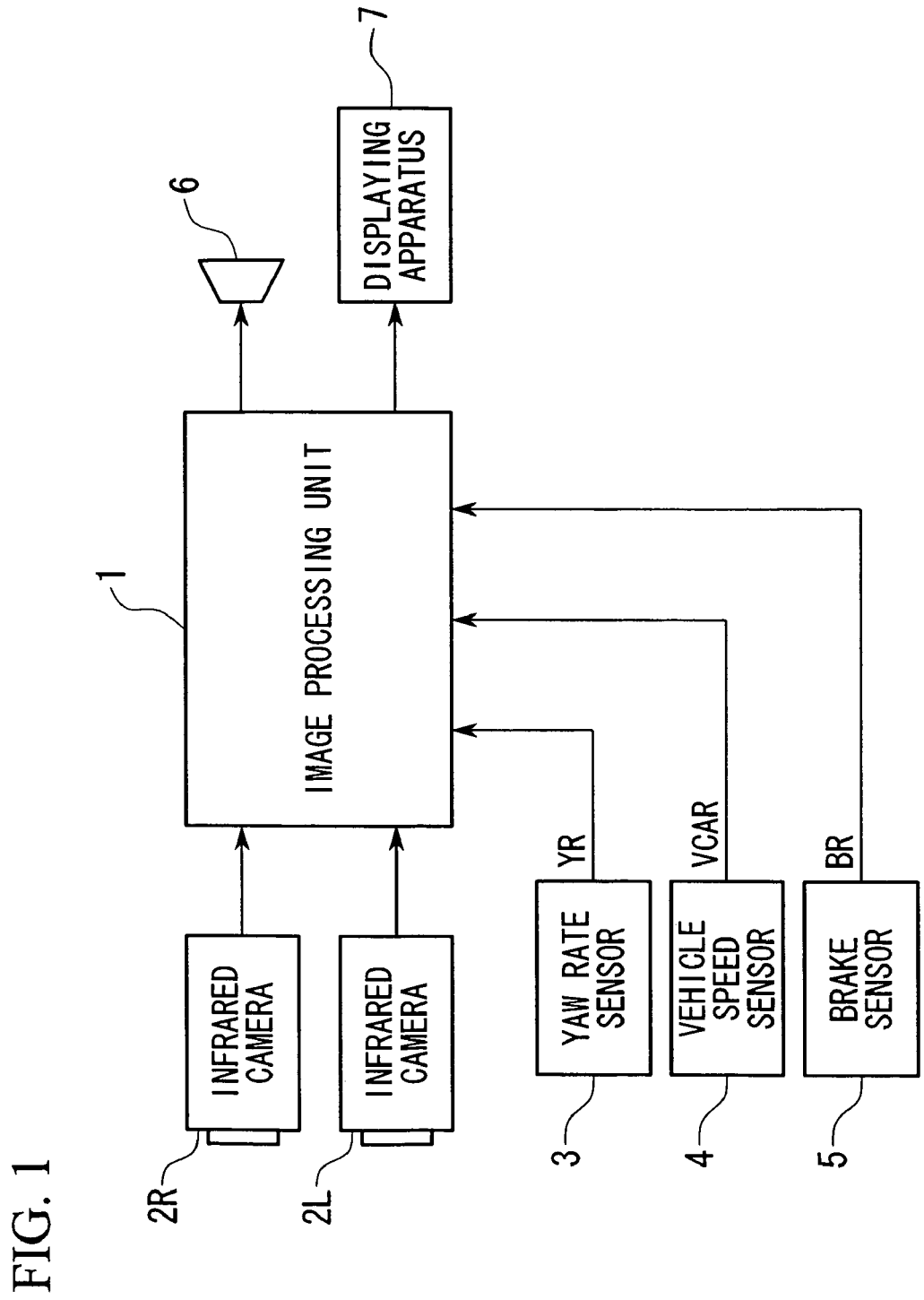
FIG. 1 is a block diagram showing the constitution of the vehicle surroundings monitoring apparatus of one embodiment of the present invention.

FIG. 1 is a block diagram showing the constitution of the vehicle surroundings monitoring apparatus of one embodiment of the present invention.

In FIG. 1, a mark 1 is the image-processing unit equipped with CPU (central processing unit) which controls the vehicle surroundings monitoring apparatus of this embodiment, and a brake sensor 5 for detecting operation of two infrared cameras 2R and 2L which can detect far-infrared rays, a yaw rate sensor 3 which detects yaw rate of the vehicle and a speed sensor 4 which detects the running speed (speed) of the vehicle, and brakes are connected. Thereby, the image-processing unit 1 detects an object which moves, such as a pedestrian who is present in front of the vehicle and an animal, from an infrared image of the vehicle surroundings and the signal which shows the running state of the vehicle, and the image-processing unit 1 outputs an alarm when it judges that the possibility of a collision is high.

Moreover, a speaker 6 for emitting an alarm by a sound, and an image display equipment 7 containing a device which displays images photographed by the infrared cameras 2R and 2L, and which informs a driver of the vehicle of an object which has a high possibility of a collision, such as a meter unified display in which a meter for indicating the running state of one's own vehicle using numerals is unified, a Navi Display which is disposed in the console of one's own vehicle, and a HUD (Head Up Display) 7a which displays information on the portion on the front window which does not obstruct the front view of the driver are connected to the image-processing unit 1.

Moreover, the image-processing unit 1 is equipped with an A/D conversion circuit which converts an input analog signal into a digital signal, an image memory which memorizes the digitized image signal, CPU (central processing unit) which performs various operation processing, a RAM (Random Access Memory) used in order that CPU memorize the data in the middle of operation, a ROM (Read Only Memory) which memorizes the program which CPU performs, a table, a map, etc., and an outputting circuit which outputs the drive signal of the speaker 6, and the display signal of image displaying device 7, etc., and each output signal of infrared cameras 2R and 2L and the yaw rate sensor 3, the speed sensor 4, and the brake sensor 5 is constituted so that it may be converted into a digital signal and may be inputted into the CPU.

Moreover, the image-processing unit 1 is equipped with a pedestrian leg characteristic value storing device in which the characteristic value of the leg of a pedestrian is stored, and an umbrella characteristic value storing device in which the characteristic value of the umbrella held by a pedestrian is stored. The characteristic value of the leg of a pedestrian is utilized in a pedestrian judging process in order to recognize a pedestrian who is in the vehicle surroundings, even when the vehicle surroundings includes rainy weather and hence a pedestrian is holding an umbrella and therefore comparatively distinguishable physical characteristics of a pedestrian who is present on a road, such as the head of a pedestrian, have not been photographed by the infrared camera.

Figure 2:
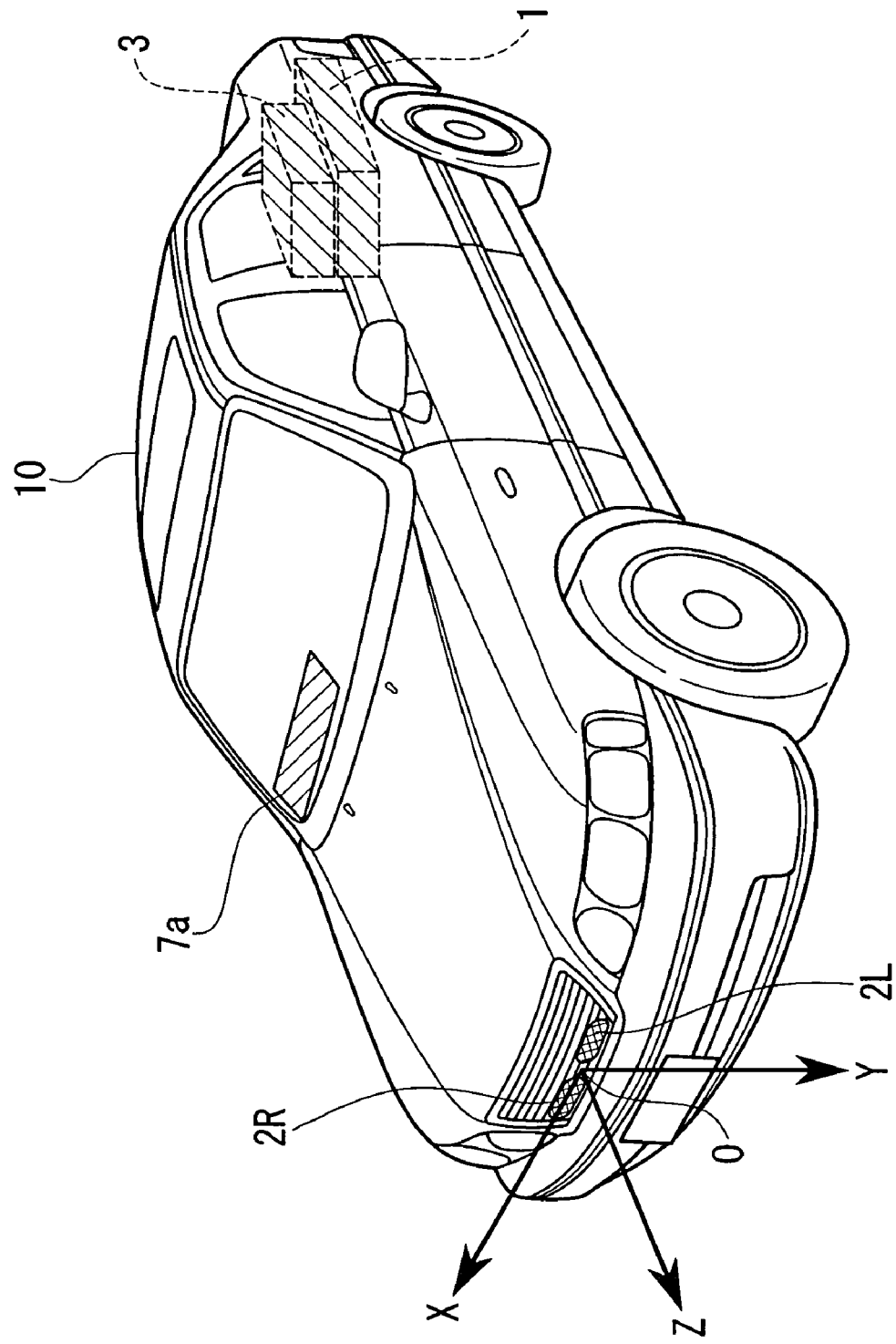
FIG. 2 is a figure showing attachment positions, such as an infrared camera, a sensor, and a display, etc., in the vehicle of the embodiment of the present invention.

Moreover, as shown in FIG. 2, the infrared cameras 2R and 2L are arranged to the front part of the one's own automobile 10, at the position which is almost symmetrical to the central part in the width direction of the automobile 10, and they are fixed such that the optical axis of the two infrared cameras 2R and 2L may be mutually parallel and both their heights from the road surface may be identical with each other. It should be noted that, the infrared cameras 2R and 2L have the characteristic that the higher the temperature of an object will be, the higher the output signal level becomes (luminance increases).

Moreover, HUD 7a is disposed so that a display screen may be displayed on the position which does not obstruct the front field of view of the driver through the front window of the one's own automobile 10.

Next, operation of this embodiment will be explained referring to drawings.

(Object Detection and Alarm Operation)

Figure 3:
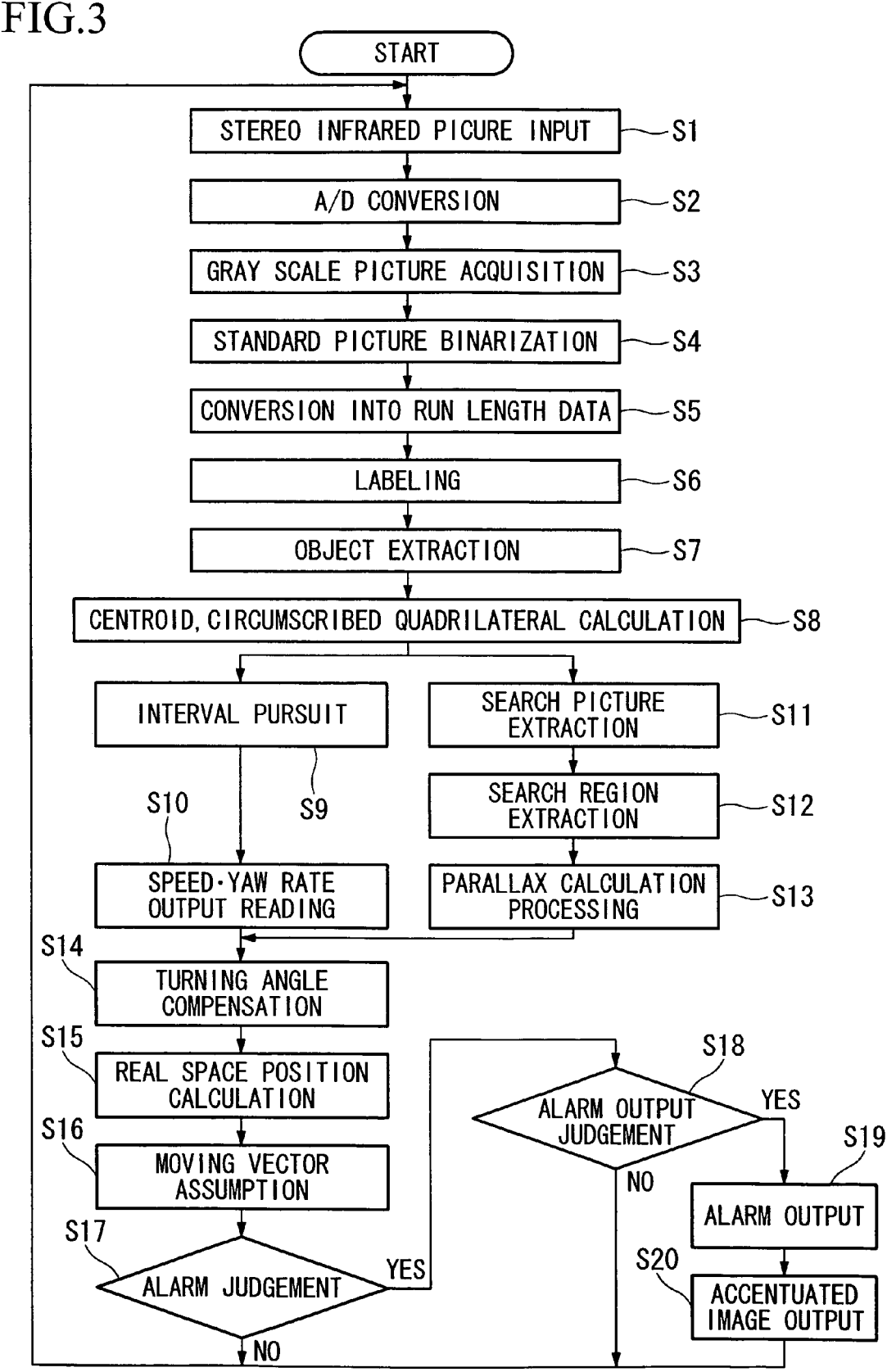
FIG. 3 is a flow chart which shows object detection and alarm operation of the vehicle surroundings monitoring apparatus in this embodiment of the present invention.

FIG. 3 is a flow chart which shows detecting of the object and alarm operation of a pedestrian, etc., in the image-processing unit 1 of the vehicle surroundings monitoring apparatus of this embodiment.

In FIG. 3, first, the image-processing unit 1 acquires an infrared image which is an output signal of the infrared cameras 2R and 2L (Step S1), and performs A/D conversion (Step S2), to store a gray scale image in an image memory (Step S3). It should be noted that a right image is obtained by the infrared camera 2R here, and a left image is obtained by the infrared camera 2L. Moreover, in the right image and the left image, the level position displayed on the display screen of the same object shifts, and hence the distance to that object can be calculated depending on this gap (parallax).

If the gray scale image is obtained in Step S3, next, a binarizing process of the image is performed, using the right image obtained by the infrared camera 2R as a standard image. That is, a processing of regarding a region brighter than the luminance threshold ITH as "1" (white), whereas regarding a region darker than the luminance threshold ITH as "0" (black), is performed (Step S4).

Figure 4A:
FIG. 4A is a figure showing the gray scale image obtained by an infrared camera.
Figure 4B:
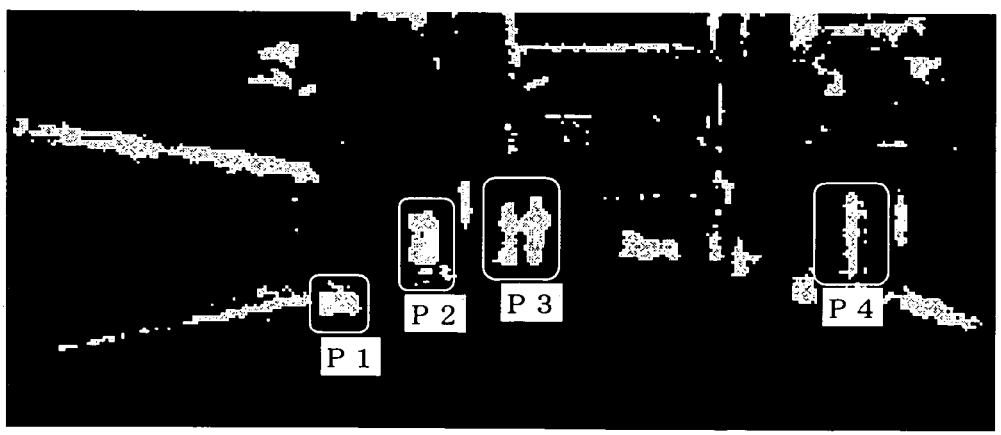
FIG. 4B is a binarized image of the image of FIG.4A.

FIG. 4A shows a gray scale image obtained by the infrared camera 2R, and the gray scale image is subjected to a binarizing process to obtain a image shown in FIG. 4B. It should be noted that, for example, in FIG. 4B, the objects enclosed with the frames P1 to P4 will be determined to be the objects which are displayed as white on a display screen (it will be referred to as "high-luminance region" hereinafter).

If the image data which is binarized is obtained from an infrared image, a processing of converting the image data into run length data will be performed (Step S5). The line expressed by a run length data involves showing the region which became white by a binarizing process at the pixel level, and all of which has a width of 1 pixel in the y direction, and has the length of the pixel which constitutes the run length data, respectively in the x direction.

Next, from the image data which are converted into a run length data, labeling (Step S6) of an object is performed, and thereby performing an extraction of the object (Step S7). That is, in the lines which are converted into run length data, the line which has overlapping portions in the y direction is regarded as an object, as a result, for example, each of the high-luminance regions P1 to P4 shown in FIG. 4B will be grasped as an object (binarized object).

If the extraction of the binarized object is completed, next, the centroid G of the extracted binarized object, area S, and the aspect ratio ASPECT of a circumscribed quadrangle will be calculated (Step S8).

Here, if the run length data of an object of label A is supposed to be (x [i], y [i], run [i], A) (I=0, 1, 2, ... N−1), the area S can be calculated by integrating the length (run[i]−1) of run length data on the same object (N pieces of run length data). Moreover, the coordinates (xc, yc) of the centroid G of the object A can be calculated by multiplying the length of each of run length data (run[i]−1) with coordinates of each of run length data x [i], or y [i], respectively, and integrating the resultant product on the same object, and then dividing the resultant integrated value by the area S.

Furthermore, the aspect ratio ASPECT can be calculated as the ratio Dy/Dx of the length Dy in the lengthwise direction of the circumscribed quadrangle of the object, and the length Dx in a transverse direction.

It should be noted that since the run length data is expressed by the number of pixels (coordinate number) (=run [i]), it is necessary to reduce by one, that is performing "−1" (to subtract by 1) to obtain actual length (=run [i]−1). Moreover, the centroid position G may be substituted by the centroid position of a circumscribed quadrangle.

If the aspect ratio of the centroid of the binarized object, area, and a circumscribed quadrangle are calculated, next, an intervallic pursuit of an object, that is recognition of the same object for every sampling period is performed (Step S9). In the intervallic pursuit, the time t as an analog amount is digitized with a sampling period to obtain a digitized time k, and for example, when the objects A and B are extracted at the time k, then it is judged whether the objects C and D which are extracted at the time (k+1) are identical or not with the objects and B, respectively. And if it is judged that the objects A and B are identical with the objects C and D, respectively, then the labels of the objects C and D are changed to be the objects A and B, respectively, thereby performing an intervallic pursuit.

Moreover, the position coordinate (centroid) of each object recognized by doing in this way is stored in a memory as a time series position data, and is used in the later operation processing.

It should be noted that, processing of the steps S4 to S9 explained above is performed on the standard image (the right image in this embodiment) which is binarized.

Next, speed VCAR detected by the speed sensor 4 and yaw rate YR detected by the yaw rate sensor 3 are read, and the yaw rate YR is subjected to time integration to calculate turning angle θr of one's own automobile 10 (step 10).

On the other hand, concurrently with the processing of the step S9 and the step S10, processing of calculating the distance z between an object and the one's own automobile 10 is performed in the steps S11 to S13. Since this operation necessitates a time longer than those of the steps S9 and S10, it is performed a cycle (for example, about 3 times of the execution cycle of the steps S1 to S10) longer than those of the steps S9 and S10.

First, a search image R1 (here, the whole region surrounded with a circumscribed quadrangle is set to be a search image, and the circumscribed quadrangle of this search image is referred to as an object frame) is extracted from the right image by selecting one of the object which is pursued by the binarized image of a standard image (right image) (Step S11).

Next, a search region for searching an image (hereinafter it will be referred to as "correspondence image") which corresponds to the search image R1 out of the left image is set up, correlation operation is performed, and the correspondence image R4 is extracted (step S12).

Specifically, the search region R2 is set up in the left image, according to each peak coordinate of the search image R1, and the luminance difference total value C which shows correlative height with the search image R1 in the search region R2 is calculated, and the region where this total value C (a, b) becomes the minimum is extracted as a correspondence image. It should be noted that this correlation operation is performed not using the binarized image but using the gray scale image. Moreover, when there is position data of the past about the same object, based on the position data, a region R2a narrower than the search region R2 is set up as the search region.

By processing of the step S12, since the search image R1 and the correspondence image R4 corresponding to this object to the inside of the left image are extracted in the standard image (right image), next, the centroid position of the search image R1, the centroid position of the correspondence image R4, and the parallax Δd (pixel number) are obtained, and the distance z between the one's own automobile 10 and an object is calculated therefrom (step S13).

Moreover, if the calculation of the turning angle θr in the step S10 and of the distance to the object in the step S13 are completed, next, a turning angle compensation for compensating the position drift on the image caused by turning of the one's own automobile 10 is performed (Step S14). The turning angle compensation is a processing for compensating the position shift, which occurs, for example, if the one's own automobile 10 turns to the left by a turning angle θr during a period from the time k to the time (k+1), the range of an image shifts by Δx in the x direction on the image acquired by a camera.

Moreover, if the turning angle compensation is ended, the coordinates (x, y) and the distance z in the image will be converted into real space coordinates (X, Y, Z) (step S15).

Here, as shown in FIG. 2, the real space coordinates (X, Y, Z) are determined, with putting the origin O on the position (position fixed to the one's own automobile 10) of the middle point of the attachment position of the infrared cameras 2R and 2L, whereas the coordinates in an image are determined with putting the origin at the center of the image, while regarding the horizontal direction as x and regarding the vertical direction as y. It should be noted that in the following explanation the coordinates after angle compensation are displayed as (X, Y, Z).

Next, when the turning angle compensation to the real space coordinates is completed, from N pieces (for example, N=approximately 10) of the real space position data after the turning angle compensation concerning the same object, that is a time series data, the approximation straight line LMV corresponding to the relative displacement vector of an object and the one's own automobile 10 will be obtained.

Subsequently, the newest position coordinate P(0)=(X (0), Y (0), Z (0)), and the position coordinate P(N−1)=(X (N−1), Y (N−1), Z (N−1)) before the (N−1) sampling (before time ΔT) are compensated in the position on the approximation straight line LMV, and the position coordinate after the compensation Pv (0)=(Xv (0), Yv (0), Zv (0)) and Pv(N−1) =(Xv (N−1), Yv (N−1), Zv (N−1)) are obtained. Thereby, a relative displacement vector can be obtained from the position coordinate Pv (N−1) as a vector which goes to the Pv (0) (Step S16).

Thus, by calculating the approximation straight line which approximates the relative displacement locus of an object to the one's own automobile 10 from the plural data of in a monitoring period ΔT (N pieces), and obtaining a relative displacement vector, it becomes possible to reduce the influence of a position detection error and to predict the possibility of the collision with an object more precisely.

Moreover, in the step S16, if the relative displacement vector is obtained, next, an alarm judging processing of judging the possibility of the collision with the detected object is performed (step S17). It should be noted that about the alarm judging processing, details will be mentioned later.

In the step S17, when it is judged that there is no possibility of the collision with the one's own automobile 10 and the detected object (NO in the step S17), it returns to the step S1 and the above-discussed processing is repeated.

Moreover, in the step S17, when it judged that there is possibility of the collision with the one's own automobile 10 and the detected object (YES in the step S17), it progresses to an alarm output judging processing in the step S18.

In the step S18, an alarm output judging processing is performed, that is, it is judged whether alarm should be outputted or not by judging whether the driver of the one's own automobile 10 is braking or not, from an output BR of the brake sensor 5 (Step S18).

When the driver of the one's own automobile 10 is braking, the acceleration Gs (the slowdown direction is regarded as positive) generated thereby is calculated, it is judged that a collision will be avoided by braking when this acceleration Gs is more than the acceleration threshold GTH, and alarm output judging processing is ended (NO in the step S18), it returns to the step S1, and the above processing is repeated.

Thus, when suitable braking is performed, no alarm is outputted, thereby avoiding giving a driver excessive troublesomeness.

Moreover, when acceleration Gs is not more than the acceleration threshold GTH or if the driver of the one's own automobile 10 is not braking, it progresses to processing of the step S19 immediately (YES in the step S18), and since the possibility of coming into contact with the object is high, the alarm by a sound through a speaker 6 is emitted (step S19) and simultaneously, for example, a image obtained by the infrared camera 2R is outputted to the image displaying device 7, thereby displaying the object which is approaching as an emphasized image to the driver of the one's own automobile 10 (step S20).

It should be noted that the acceleration threshold GTH is a value corresponding to the condition that the one's own automobile 10 can stop within the distance being not more than the distance Zv(0) between the object and the one's own automobile 10, if the acceleration Gs under brake operation is maintained as it is.

(Alarm Judging Processing)

Next, referring to the flow chart shown in FIG. 5, the alarm judging processing in the step S17 of the flow chart shown in FIG. 3 will be explained in detail.

Figure 5:
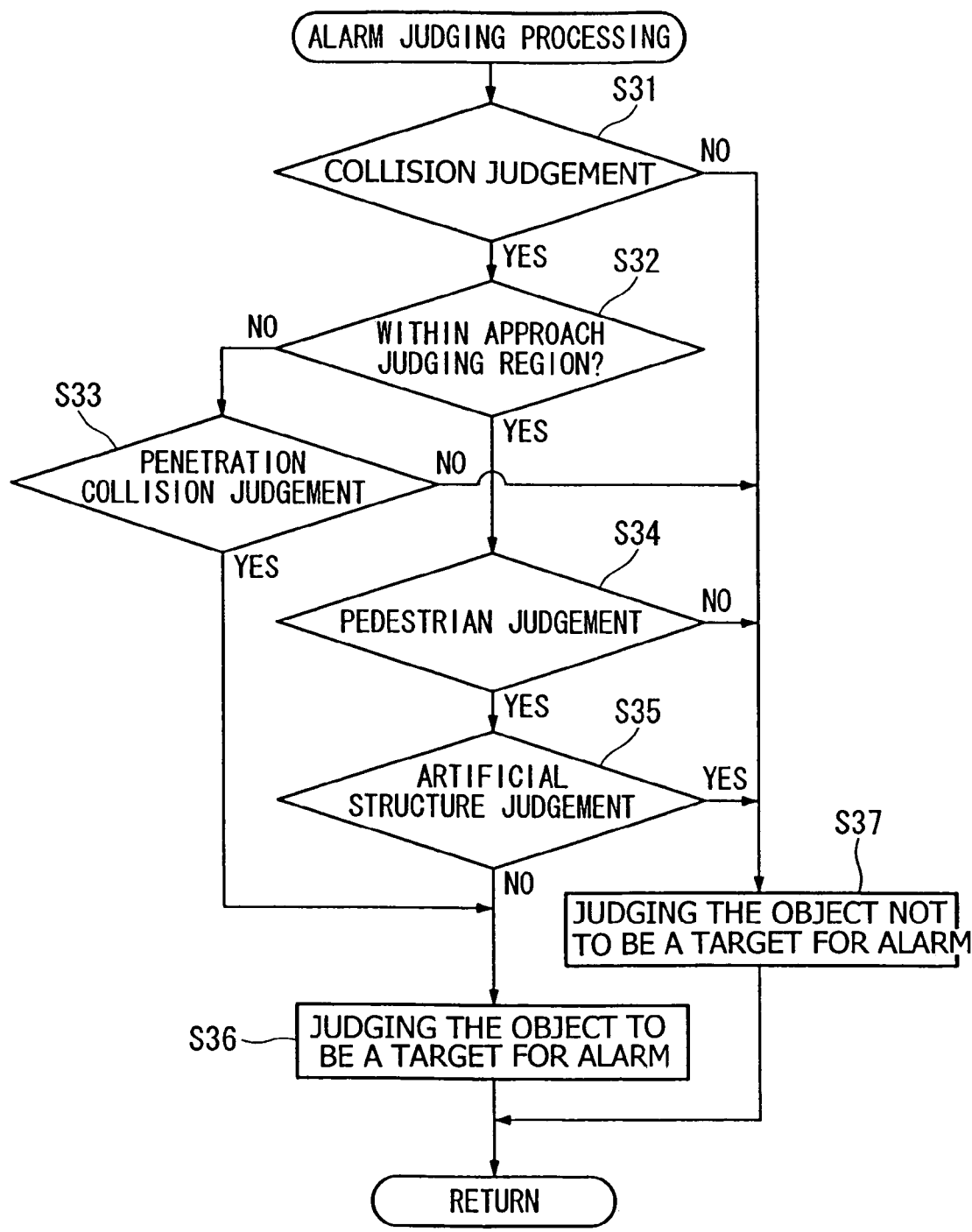
FIG. 5 is a flow chart which shows alarm judging processing operation in the embodiment of the present invention.

FIG. 5 is a flow chart which shows alarm judging processing operation of this embodiment.

The alarm judging processing is the processing to judge the possibility of a collision of the one's own automobile 10 with the object which is detected, by a collision judging processing shown below, a judgment processing of judging whether it is within an approach judging region or not, a penetration collision judging processing, a pedestrian judging processing, and an artificial structure judging processing. Hereinafter, it will be explained, with taking the case in which an object 20 exists, which is advancing at speed Vp from a direction of approximately 90° to the direction of movement of the one's own automobile 10, as shown in FIG. 6, for instance.

In FIG. 5, first, the image-processing unit 1 performs the collision judging processing (step S31).

Figure 6:
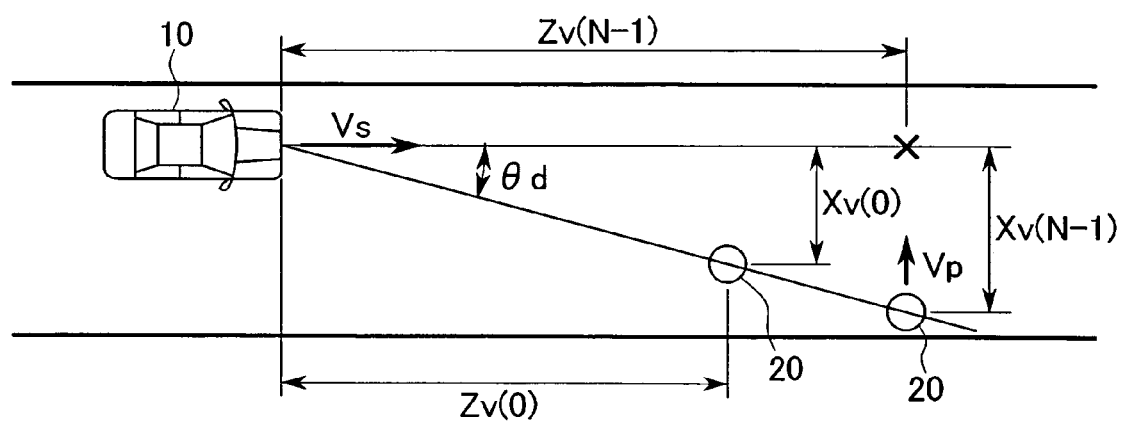
FIG. 6 is a figure showing the case where a collision is easy to be generated.

In FIG. 6, the collision judging processing is a processing to judge whether the one's own automobile 10 comes into collision with the object 20 or not within an allowance time T, when the object 20 approaches from the distance Zv (N−1) to the distance Zv (0) in the time ΔT, while taking a relative velocity Vs between the object 20 and the one's own automobile 10 in Z direction and assuming that both maintain the relative velocity Vs and move within a height H.

Here, the allowance time T is intended to judge the possibility of a collision before the predicted collision time by the time T. Therefore, the allowance time T is set as approximately 2 to 5 seconds. Moreover, H is a predetermined height which specifies the range of the height direction, for example, is set as approximately 2 times of the vehicle height of the one's own automobile 10.

Figure 7:
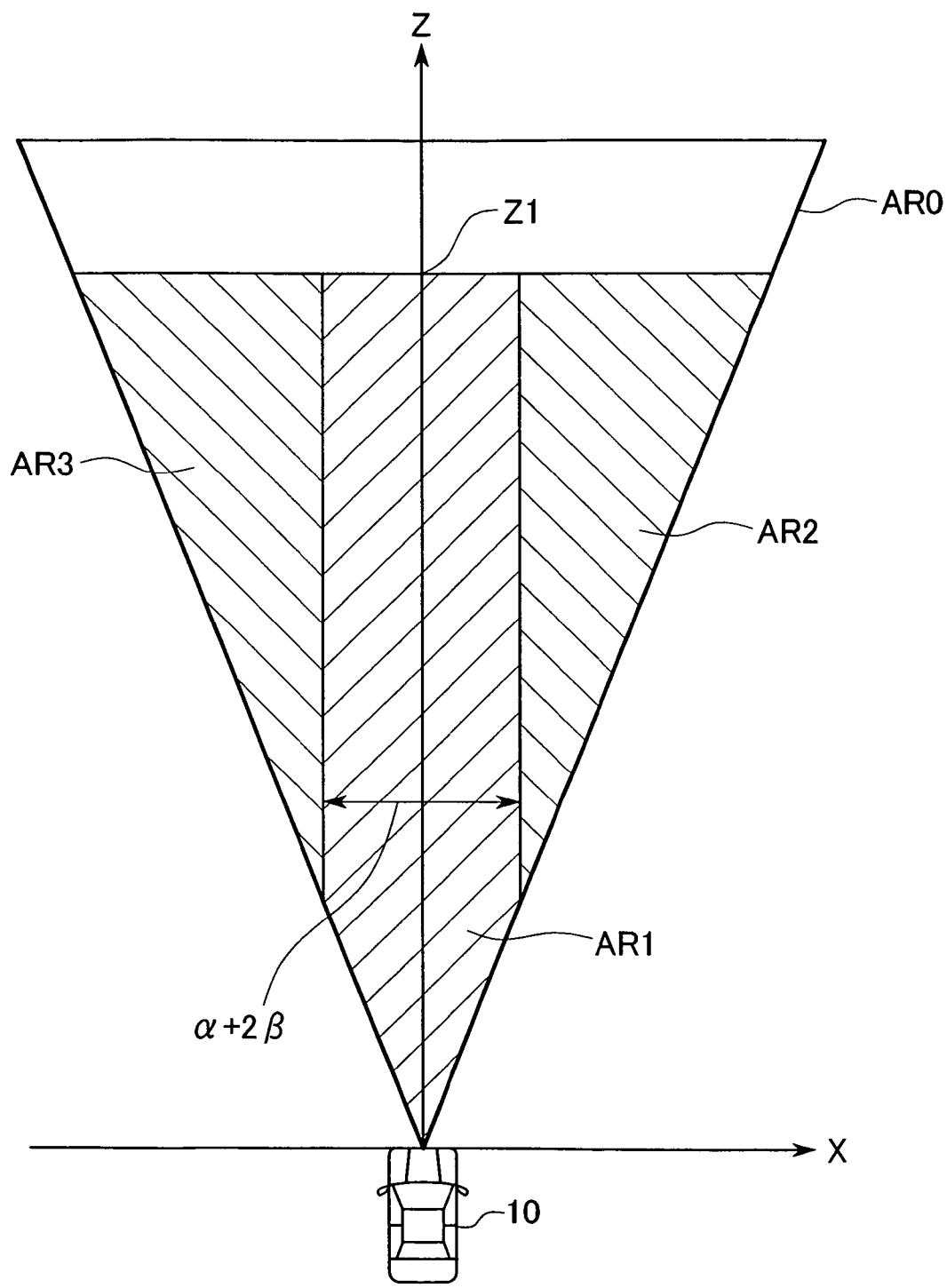
FIG. 7 is a figure showing the region classification in front of a vehicle.

Next, in the step S31, when the one's own automobile 10 may come into collision with the object within the allowance time T (YES in the step S31), in order to increase the reliability of the judgment further, the image-processing unit 1 judges whether an object exists or not in an approach judging region (step S32). Assuming that the region which can be surveyed by the infrared cameras 2R and 2L is supposed to be a region AR0 which is an outer triangle indicated by a thick solid line as shown in FIG. 7, judging whether it is within the approach judging region or not, is a processing to judge whether an object is present or not within the region AR1 or not, which corresponds to a region which is closer to the one's own automobile than Z1=Vs×T within the region AR0, and a range encompassing margins β, β (for example, approximately 5 to 100 cm) in addition to both sides of the width a of the one's own automobile 10, that is, the approach judging region AR1 where the possibility of collision of the one's own automobile 10 with the object is very high, if the object will be present as it is. It should be noted that the approach judging region AR1 also has a predetermined height H.

Furthermore, in the step S32, when an object is not present in the approach judging region (NO in the step S32), the image-processing unit 1 performs a penetration collision judging processing to judge whether an object may come into the approach judging region and may come into collision with the one's own automobile 10 (step S33). The penetration collision judging processing is a processing to judge whether the object which is present within region (transverse direction outside of the approach judging region) AR2 or AR3, where the absolute value of X coordinates is larger than that of the approach judging region AR1, may move to come into the approach judging region AR1 and may come into collision with the one's own automobile 10.

It should be noted that the penetration judging regions AR2 and AR3 also have a predetermined height H.

On the other hand, in the step S32, when the object is present within the approach judging region (YES in the step S32), the image-processing unit 1 performs the pedestrian judging processing to judge whether the object may be a pedestrian or not (step S34). It should be noted that the pedestrian judging processing will be explained in detail, later.

Moreover, in the step S34, when it is judged that the object has a possibility of being a pedestrian (YES in the step S34), in order to increase the reliability of the judgment further, an artificial structure judging processing to judge whether the object is an artificial structure or not, is performed (step S35). The artificial structure judging processing is a processing to judge that this object is an artificial structure and to exclude the object from the target of an alarm, when the following features which cannot be thought as those of a pedestrian are detected in the image of the object, for example, following features (a) to (d).
(a) When the portion which shows a straight line edge is contained in the image of the object.
(b) When the angle of the image of the object is right-angled.
(c) When plural things of the same shape are contained in the image of the object.
(d) When the image of the object is identical with the shape of the artificial structure which is registered beforehand.

Therefore, when there is a possibility that the object may come into the approach judging region and may come into collision with the one's own automobile 10 in the step S33 (YES in the step S33), and when the object which is judged to have a possibility of being a pedestrian is not an artificial structure in the step 35 (NO in the step 535), the image-processing unit 1 judges that there is a possibility that the one's own automobile 10 comes into collision with the object (it is the target of the alarm)(step S36), and progresses to the step S18 as YES in the step S17 shown in FIG. 3 to perform an alarm output judging processing (Step S18).

On the other hand, in the step S31, when there is no possibility that the one's own automobile 10 comes into collision with the object within the allowance time T (NO in the step S31), when there is no possibility that the object comes into the approach judging region and comes into collision with the one's own automobile 10 (NO in the step S33), when it is judged that the object has no possibility of being a pedestrian (NO in the step S34), or when the object which is judged to have a possibility of being a pedestrian is an artificial structure in the step S35 (YES in the step S35), the image-processing unit 1 judges that there is no possibility that the one's own automobile 10 comes into collision with the detected object (it is not the target of alarm) (step S37), and returns to the step S1 as NO in the step S17 shown in FIG. 3, and repeats the object detection and the alarm operation of a pedestrian etc.

(Pedestrian Judging Processing)

Figure 8:
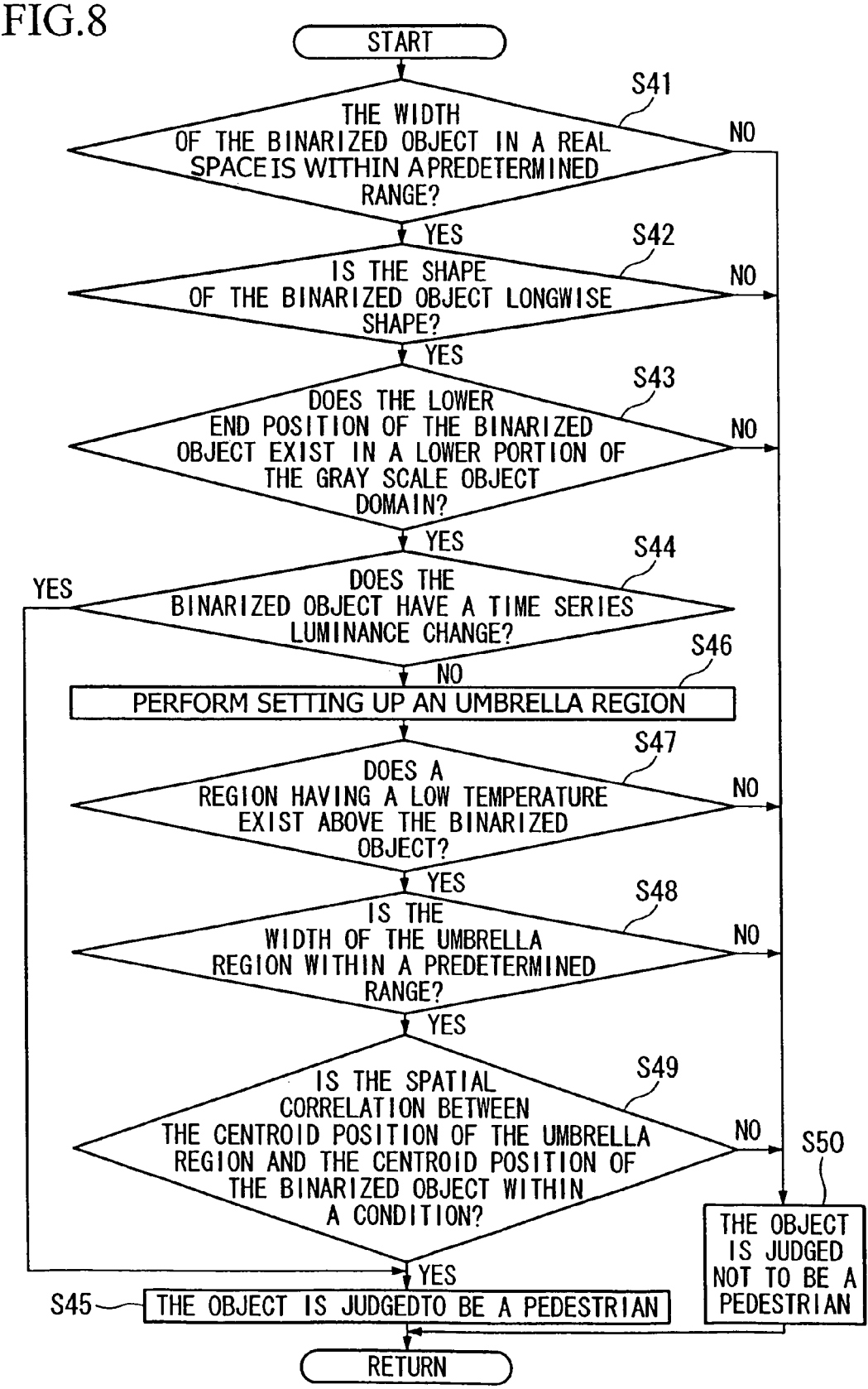
FIG. 8 is a flow chart which shows pedestrian judging processing operation in case that the surroundings of vehicles in the embodiment of the present invention is in a rain state.

Next, with referring to a flow chart shown in FIG. 8 and schematic diagrams shown in FIGS. 9 to 12, the pedestrian judging processing in the step S34 shown in FIG. 5 will be explained-in detail further. FIG. 8 is a flow chart which shows the pedestrian judging processing operation when the surroundings of the vehicle in this embodiment is in a rainfall state.

In the pedestrian judging processing of this embodiment, when the surroundings of a vehicle is not in a rainfall state, a pedestrian is recognized from an object by the shape judging about comparatively distinguishable physical characteristics of a pedestrian who is present on the road, such as a pedestrian's head, as usual. On the other hand, in order to recognize a pedestrian, even when the surroundings of the vehicle is in a rainfall state and the pedestrian who is present on the road holds up the umbrella, and hence his comparatively distinguishable physical characteristics such as a pedestrian's head, is not caught by the infrared camera, the pedestrian judging processing of this embodiment recognizes a pedestrian by confirming the existence of the leg of the pedestrian in a gray scale image or the existence of the umbrella which is held by the pedestrian. Moreover, the pedestrian judging processing of this embodiment performs a series of the processing shown in FIG. 8, for example, at a cycle of 100 msec, when the surroundings of the vehicle is in a rainfall state.

It should be noted whether the surroundings of the vehicle is in a rainfall state or not can be judged from the operation state of the wiper which is disposed to the one's own automobile 10 which is equipped with a wiper operation state detection device to detect the operation state of the wiper, or from an output signal outputted by the raindrop sensor which is disposed in the one's own automobile 10 which is equipped with the raindrop sensor which detects a raindrop.

Figure 9:
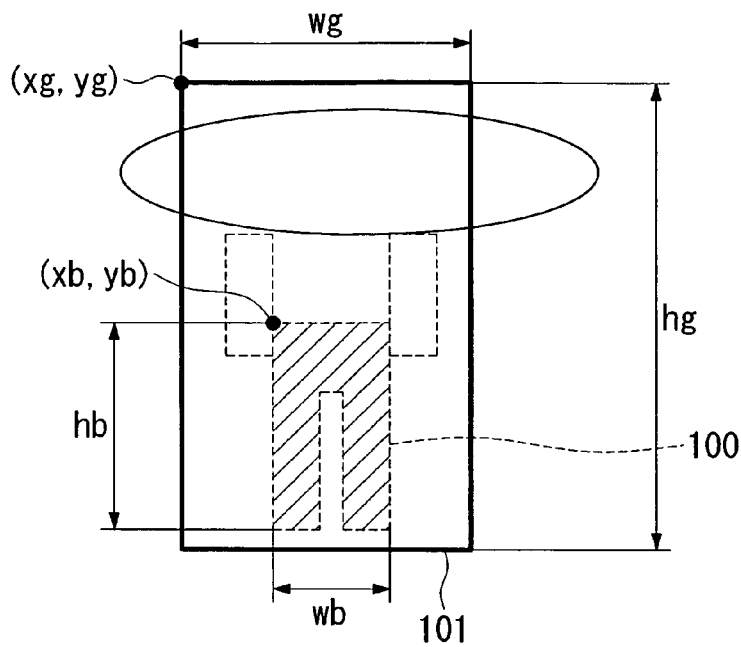
FIG. 9 is a figure showing the spatial correlation between the binarized object at the time of performing a leg existence judging of a pedestrian in pedestrian judging processing, and a gray scale object region.

The pedestrian judging processing in the case in which the surroundings of the vehicle is in a rainfall state will be explained in detail. In order to confirm existence of the leg of the pedestrian in a gray scale image, in FIG. 8, first, the image-processing unit 1 judges whether the width WB in the real space of the target binarized object 100 is a width suitable as a pedestrian's leg, and whether the width WB in the real space of binarized object 100 is within a predetermined range (step S41), as shown in FIG. 9 showing the spatial correlation between the binarized object at the time of performing a leg existence judging of a pedestrian, and a gray scale object region. Specifically, it is judged whether the width WB in the real space of the binarized object 100 calculated by following the formula (1) is not less than the leg minimum width (for example, 30 [cm]) set up beforehand, and is not more than the leg maximum width (for example, 70 [cm]) set up beforehand.

$$WB = wb \times \text{Distance}/(F/p) \quad (1)$$

It should be noted that in the formula (1), wb represents the width (width of the circumscribed quadrangle of the binarized object) on the image of the binarized object 100, as shown in FIG. 9, and the "Distance" represents the distance [m] between the binarized object 100 and the one's own automobile 10 in the real space, F represents the focal length [m] of the infrared cameras 2R and 2L, and p represents a pixel pitch [m/pixel], respectively.

If, in the step S41, it is judged that the width WB in the real space of the binarized object 100 is not less than the leg minimum width (for example, 30 [cm]), and not more than the leg maximum width (for example, 70[cm]), and that the width WB in the real space of the target binarized object 100 is a width being suitable as a pedestrian's leg (YES in the step S41), next, the image-processing unit 1 judges whether the target binarized object 100 is longwise shape or not (step S42). Specifically, it is judged whether the ratio (hb/wb) of the height (height of the circumscribed quadrangle of the binarized object) hb on the image of binarized object 100 and the width wb on the image of the binarized object 100 is not less than the aspect ratio threshold (for example, 1), and, when "(hb/wb)≧the aspect ratio threshold", it is judged that the binarized object 100 has longwise shape.

And in the step S42, when it is judged that "(hb/wb)≧the aspect ratio threshold", and that the target binarized object 100 has longwise shape (YES in the step S42), the image-processing unit 1 judges whether the lower end position of the binarized object 100 exists within the lower part (lower half) of the gray scale object region (the object on a gray scale image) (step S43). Specifically, as shown in FIG. 9, a gray scale object region 101 which is a region of the object on the gray scale image which includes the binarized object 100 is set up, and, it is judged whether the position of the binarized object 100 satisfies following the formula (2) to the height hg of this gray scale object region 101.

$$yb+hb \geq yg+hg/2 \qquad (2)$$

It should be noted that in the formula (2), yb represents the Y-axis coordinates of the upper left end coordinates (xb, yb) of the binarized object 100 at the time of regarding the upper left end of a gray scale image as the origin (0, 0), as shown in FIG. 9. Moreover, yg represents the Y-axis coordinates of the upper left end coordinates (xg, yg) of the gray scale object region 101 at the time of regarding the upper left end of a gray scale image as the origin (0, 0) similarly.

Moreover, the image-processing unit 1 arranges plural mask regions of a predetermined size from the upper end of the binarized object circumscribed quadrangle, and sets them up on the gray scale image, and extracts a region which includes a mask region where the luminance change in the mask region is large (the object and the background image are contained), the degree of correlation of the mask region between the right image and the left image is high, and the same distance (the same parallax) as the binarized object, thereby obtaining the gray scale object region 101.

Moreover, in the step S43, when it is judged that the position of the binarized object 100 satisfies the formula (2) to the height hg of the gray scale object region 101, and that the lower end position of the binarized object 100 exists within the lower part (lower half) of the gray scale object region 101 (YES in the step S43), it is judged whether the image-processing unit 1 has a time series luminance change in the binarized object 100 (step S44). Since the shape on the image will change as a pedestrian walks, if the binarized object 100 is a pedestrian's leg, this processing is performed in order to detect that change.

Specifically, the luminance distribution in the circumscribed quadrangle of the binarized object is obtained, and the standard deviation a of the luminance distribution is calculated from the variation in this luminance distribution. Next, it is judged whether the calculated standard deviation σ is not less than the luminance distribution judging threshold σ TH or not. It should be noted that when the image-processing unit 1 calculates the standard deviation σ of the luminance distribution, the execution cycle of processing calculates the standard deviation σ of the luminance distribution as for example, approximately 0.5 [second] from the variation in m luminance distributions obtained in this 0.5 [second].

In the step S44, it is judged that the calculated standard deviation σ is not less than the luminance distribution judging threshold σTH, and that a time series luminance change is present in the binarized object 100, the binarized object 100 is recognized to be a pedestrian's leg (YES in the step S44), the image-processing unit 1 judges that the detected object is a pedestrian (step S45) to terminate the pedestrian judging processing, and progresses to the step S35 in FIG. 5 as YES in the Step S34 shown in FIG. 5, thereby performing an artificial structure judging.

On the other hand, when judging whether a time series luminance change occurs or not, although the leg of a walking pedestrian can be recognized, if a pedestrian stands still, the shape on a image will not change with passage of time, even if the binarized object is the pedestrian's leg, and hence it is not possible to be recognized as the pedestrian's leg. Then, in the step S44, when the calculated standard deviation o is less than the luminance distribution judging threshold σTH and it is judged that there are no time serial luminance changes in the binarized object 100 (NO in the step S44), the image-processing unit 1 confirms the existence of the umbrella held up by a pedestrian in the gray scale image, thereby recognizing the pedestrian.

Figure 10:
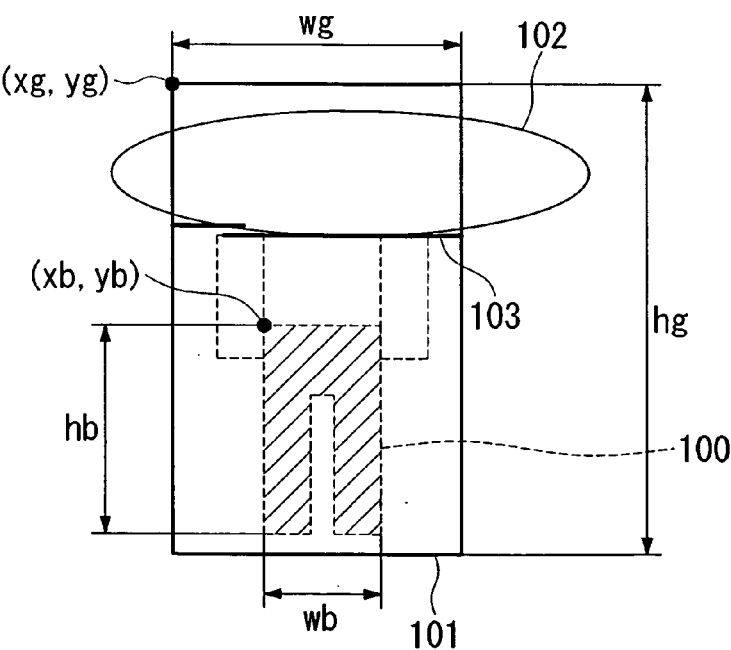
FIG. 10 is a figure showing the edge of the umbrella region at the time of performing the umbrella existence judging of the umbrella the pedestrian is holding in pedestrian judging processing.

To explain in detail, the image-processing unit 1 first will set up the umbrella region which is considered to be the umbrella held up by a pedestrian (step S46). Specifically, as shown in FIG. 10 which shows the edge of the umbrella region upon performing the umbrella existence judging, first the gray scale image is differentiated using a differentiation filter, and then binarized to judge the existence of the edge portion 103 of the region which is thought to be the umbrella the pedestrian is holding up. And if an edge portion 103 with a large luminance change exists above the binarized object 100, the Y-axis coordinates of the edge portion 103 is obtained and made the lower end position Ay of the umbrella region. On the other hand, the Y-axis coordinates of the upper end position of the gray scale object region 101 may be made the upper end position By of the umbrella region.

Figure 11:
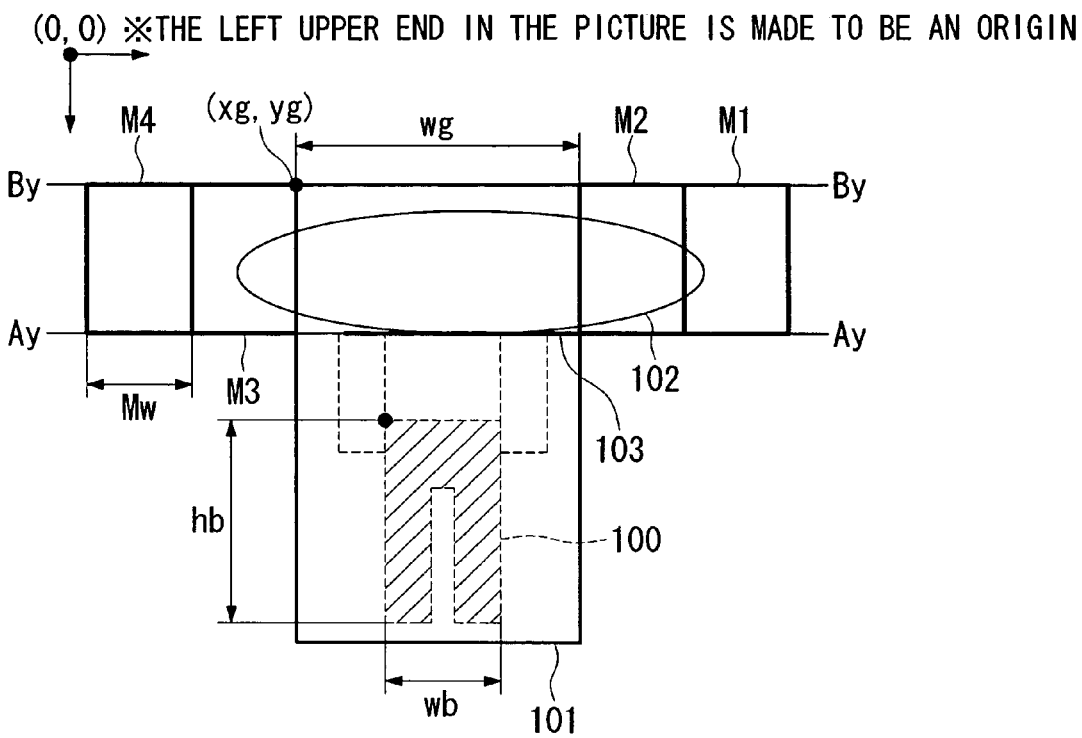
FIG. 11 is a figure showing the spatial correlation between the umbrella region and a gray scale object region at the time of performing the umbrella existence judging of the umbrella which the pedestrian is holding in pedestrian judging processing.
Figure 12:
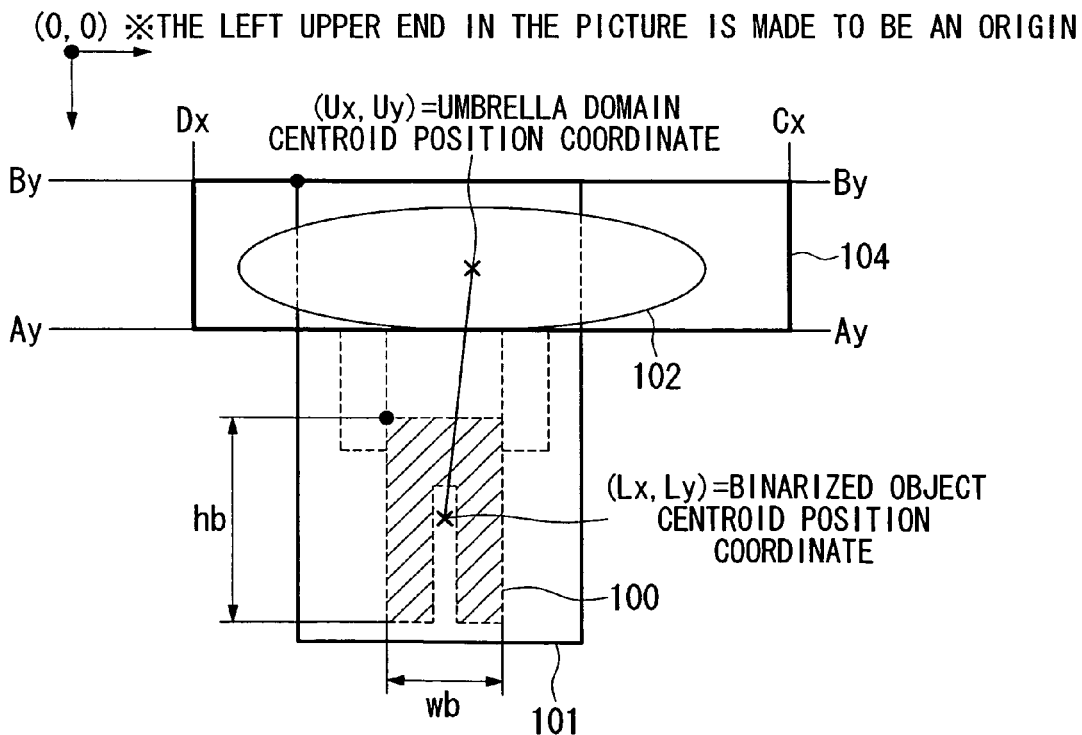
FIG. 12 is a figure showing the spatial correlation among the umbrella region, the binarized object, and a gray scale object region, at the time of performing the umbrella existence judging of the umbrella which the pedestrian is holding in pedestrian judging processing.
Figure 13:
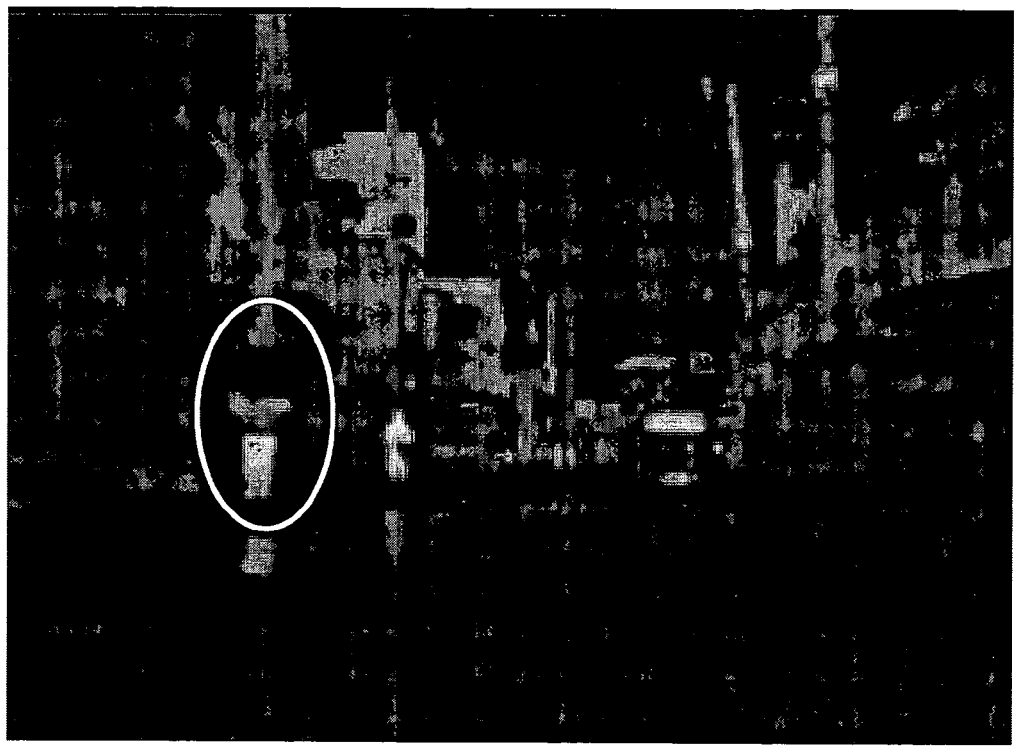
FIG. 13 is a figure showing the infrared image (gray scale image) of a pedestrian using an umbrella such that the pedestrian's head is hidden by the umbrella.

Moreover, when the edge portion 103 exists, as shown in FIG. 11 showing the spatial correlation between the umbrella region and a gray scale object region upon performing the umbrella existence judging of the umbrella the pedestrian is holding up, to the right side and the left side of the gray scale object region 101, plural mask regions M1, M2, M3, and M4 . . . having width of Mw and been interposed between the lower end position Ay of the umbrella region and the upper end position By of the umbrella region is set up, and the distances between the one's own automobile 10 and each of the mask region M1, M2, M3, and M4 are calculated. And as shown in FIG. 12 showing the spatial correlation among the umbrella region, the binarized object, and a gray scale object region, upon performing the umbrella existence judging of the umbrella the pedestrian is holding up, all of the mask regions that exist at the same distance as the binarized object 100 are integrated to presume the umbrella region 104 which shows the region which is thought to be the umbrella 102 the pedestrian is holding up.

That is, in the embodiment shown in FIG. 11, while integrating the mask regions M1, M2, and M3, to obtain the X-axis coordinates at the right end of the mask region M1 which exists at the same distance as the binarized object 100 and making this be the right end position Cx of the umbrella region. Similarly, the X-axis coordinates at the left end of the mask region M3 which exists at the same distance as the binarized object 100 are obtained, and making this to be the left end position Dx of the umbrella region, and as shown in FIG. 12, making the region surrounded by coordinates Ay, By, Cx, and Dx be the umbrella region 104.

On the other hand, in the step S46, if the umbrella region 104 which is considered to be the umbrella 102 the pedestrian is holding up can be set up, the image-processing unit 1 performs the luminance judging of the set-up umbrella region 104, and judges whether a region (a region having low luminance) of which temperature is low exists or not above the binarized object 100 (step S47). Specifically, it is judged whether the average luminance AVE of the umbrella region 104 is lower than the umbrella judging luminance threshold TH1 or not.

Moreover, in the step S47, when the average luminance AVE of the umbrella region 104 is lower than the umbrella judging luminance threshold TH1, and it is judged that a region (a region with a low luminance) with a low temperature exists above the binarized object 100 (YES in the step S47), the image-processing unit 1 judges whether the width of the umbrella region 104 is a width suitable as an umbrella the pedestrian is holding up or not, and whether the width of the umbrella region 104 is within a predetermined range or not (step S48). Specifically, it is judged whether the following formula (3) is satisfied or not about the width of the umbrella region 104(=|Cx−Dx|).

$$TH2 \leq |Cx-Dx| \leq TH3 \quad (3)$$

It should be noted that in the formula (3), TH2 represents the minimum threshold of the width of the umbrella region, and TH3 represents the maximum threshold of the width of the umbrella region, respectively. Moreover, the minimum threshold TH2 of the width of an umbrella region is set to 70 [cm] as an example, supposing a pedestrian's shoulder length. Similarly, the maximum threshold TH3 of the width of the umbrella region is set to 150 [cm] as an example, supposing the width of a widely used umbrella the pedestrian is holding up.

Moreover, in the step S48, when the width of the umbrella region 104 (=|Cx−Dx|) satisfies the formula (3), and it is judged that the width of the umbrella region 104 is a width suitable as an umbrella the pedestrian is holding up (YES in the step S48), the image-processing unit 1 judges whether the spatial correlation between the pedestrian and the umbrella the pedestrian is holding up is suitable or not, and whether the spatial correlation between the centroid position of the umbrella region 104 and the centroid position of the binarized object 100 is within the condition or not (step S49). Specifically, as shown in FIG. 12, it is judged whether the correlation between the X-axis coordinates Ux of the centroid position coordinate (Ux, Uy) of the umbrella region 104 and the X-axis coordinates Lx of the centroid position coordinate (Lx, Ly) of the binarized object 100 satisfies the following formula (4) or not.

$$|Ux-Lx| \leq TH4 \quad (4)$$

It should be noted that, in the formula (4), TH4 represents the centroid shift threshold to the centroid shift. Moreover, the centroid shift threshold TH4 is set to 35 [cm] as an example as a half of the shoulder length of the pedestrian who is assumed.

And in the step S49, when the correlation between the X-axis coordinates Ux of the centroid position coordinate of the umbrella region 104 and the X-axis coordinates Lx of the centroid position coordinate of the binarized object 100 satisfies the above formula (4), and it is judged that the spatial correlation between the centroid position coordinate of the umbrella region 104 and the centroid position coordinate of the binarized object 100 is suitable as the spatial correlation between a pedestrian and the umbrella the pedestrian is holding up, it is recognized that the umbrella the pedestrian is holding up exists above the binarized object 100 (YES of the step S49), the image-processing unit 1 judges that the detected object is a pedestrian (Step S45) to terminate the pedestrian judging processing, and progresses to the step S35 of FIG. 5 as YES in the step S34 shown in FIG. 5, and then performs the artificial structure judging.

On the other hand, in the step S41, when it is judged that the width WB in the real space of the binarized object 100 is less than the leg minimum width (for example, 30 [cm]), or more than the leg maximum width (for example, 70 [cm]), and that the width WB in the real space of the target binarized object 100 is not a width being suitable as a pedestrian's leg (NO in the step S41), the image-processing unit 1 judges that the detected object is not a pedestrian (step S50) to terminates the pedestrian judging processing, and progresses to the step S37 of FIG. 5 as NO in the step S34 shown in FIG. 5, and judges that the object is not a target for outputting alarm.

Moreover, in the step S42, when it is "(hb/wb)<the aspect ratio threshold" and it is judged that the target binarized object 100 has not a longwise shape (NO in the step S42), the image-processing unit 1 judges that the detected object is not a pedestrian (step S50) to terminate the pedestrian judging processing, and progresses to the step S37 of FIG. 5 as NO in the step S34 shown in FIG. 5, and judges that the object is not a target for outputting alarm.

Moreover, in the step S43, when the position of the binarized object 100 does not satisfy the formula (2) to the height hg of the gray scale object region 101, and it is judged that the lower end position of the binarized object 100 does not exist in the lower part (lower half) of the gray scale object region 101 (NO in the step S43)(Step S50) the image-processing unit 1 judges that the detected object is not a pedestrian to terminate the pedestrian judging processing, and progresses to the step S37 in FIG.5 as NO in the step S34 shown in FIG. 5, and judges that the object is not a target for outputting alarm.

Moreover, in the step S47, when the average luminance AVE of the umbrella region 104' is not less than the umbrella judging luminance thresholds TH, and it is judged that the region (region with low luminance) with a low temperature does not exist above the binarized object 100 (NO in the step S47), the image-processing unit 1 judges that the detected object is not a pedestrian (Step S50) to terminate the pedestrian judging processing, and progresses to the step S37 in FIG. 5 as NO in the step S34 shown in FIG. 5, and judges that the object is not a target for outputting alarm.

Moreover, in the step S48, when the width of the umbrella region 104 (=|Cx−Dx|) does not satisfy the formula (3), and it is judged that the width of the umbrella region 104 is not a width being suitable as an umbrella the pedestrian is holding up (NO in the step S48), the image-processing unit 1 judges that the detected object is not a pedestrian (the step S50) to terminate the pedestrian judging processing, and progresses to the step S37 in FIG. 5 as NO in the step S34 shown in FIG. 5, and judges that the object is not a target for outputting alarm.

Moreover, in the step S49, when the correlation between the X-axis coordinates Ux of the centroid position coordinate of the umbrella region 104 and the X-axis coordinates Lx of the centroid position coordinate of the binarized object 100 does not satisfy the above formula (4), and it is judged that the spatial correlation between the centroid position coordinate of the umbrella region 104 and the centroid position coordinate of the binarized object 100 is not suitable as spatial correlation between a pedestrian and the umbrella which the pedestrian is holding up (NO in the step S49), the image-processing unit 1 judges that the detected object is not a pedestrian (Step S50) to terminate the pedestrian judging processing, and progresses to the step S37 in FIG. 5 as "NO" in the step S34 shown in FIG. 5, and judges that the object is not a target for outputting alarm.

Moreover, in this embodiment, the image-processing unit 1 includes the binarized object extracting device, an alarm judging device, the alarm outputting device, the leg judging device, the luminance transition detecting device, and the pedestrian recognizing device. More specifically, the processing of the steps S4 to S7 in FIG. 3 corresponds to the binarized object extracting device, the processing of the steps S18 in FIG. 3 corresponds to an alarm judging device, the processing in the step S19 in FIG. 3 and the step S20 corresponds to an alarm outputting device, the processing of the steps S41 to S44 in FIG. 8 corresponds to a leg judging device, the processing in the step S44 in FIG. 8 corresponds to a luminance change detecting device, and the processing in the step S45 in FIG. 8 corresponds to a pedestrian recognizing device.

Furthermore, in this embodiment, the image-processing unit 1 includes the perimeter region calculating device, a search region setting device, a distance calculating device, and an integrated search region setting device. More specifically, the processing of the step S46 in FIG. 8 includes all of the perimeter region calculating device, the search region setting device, the distance calculating device, and the integrated search region setting device.

Furthermore, in this embodiment, the image-processing unit 1 includes an umbrella judging device, an average luminance calculating device, a width measuring device, a binarized object centroid position calculating device, and a region centroid position calculating device. More specifically, the processing of the steps S47 to S49 in FIG. 8 corresponds to the umbrella judging device, the processing of the step S47 in FIG. 8 corresponds to the average luminance calculating device, the processing of the step S48 in FIG. 8 corresponds to the width measuring device, and the processing of the step S49 in FIG. 8 corresponds to the binarized object centroid position calculating device and the region centroid position calculating device.

As explained above, when the surroundings of the vehicle is not in a rainfall state, the vehicle surroundings monitoring apparatus of this embodiment recognizes a pedestrian from an object depending on the comparatively distinguishable physical characteristics of a pedestrian who exists on the road, such as a pedestrian's head, as usual. On the other hand, when the surroundings of the vehicle is in a rainfall state, and a pedestrian is holding up an umbrella, and hence the comparatively distinguishable physical characteristics of the pedestrian who exists on the road, such as a pedestrian's head, are not caught by the infrared camera, a pedestrian is recognized by confirming the existence of the leg of the pedestrian in a gray scale image or the existence of the umbrella a pedestrian is holding up.

Specifically, when confirming the existence of the leg of the pedestrian in a gray scale image to recognize a pedestrian, as shown in FIG. 9, it is judged that the target binarized object 100 is a pedestrian's leg, and it is recognized that the detected object is a pedestrian, if all of the conditions that the width WB in the real space of the target binarized object 100 is a width suitable as a pedestrian's leg, that similarly the target binarized object 100 has a longwise shape, that similarly the lower end position of the target binarized object 100 exists in the lower part (lower half) of the gray scale object region 101, and similarly that a time series luminance change exists in the target binarized object 100.

On the other hand, when no time series luminance change exists in the target binarized object 100, and confirming existence of the umbrella the pedestrian is holding up in a gray scale image and recognizing a pedestrian, as shown in FIG. 12, in the case in which all of conditions that the region (a region with low luminance) with low temperature as an umbrella region 104 exists above the target binarized object 100, that the width of the umbrella region 104 is suitable as an umbrella the pedestrian is holding up, that the spatial correlations between the centroid position coordinate of the umbrella region 104 and the centroid position coordinate of binarized object 100 is suitable as the spatial correlation between a pedestrian and the umbrella the pedestrian is holding up, are satisfied, the umbrella the pedestrian is holding up exists above the target binarized object 100, and hence the detected object is recognized as a pedestrian.

Therefore, when recognizing the pedestrian of the surroundings of the vehicle using an infrared image, even if the head of a pedestrian which is easily distinguishable physical characteristic of a pedestrian is undetectable as usual, by judging the existence of a pedestrian's leg from an infrared image, the effect that the vehicle surroundings monitoring apparatus can judge precisely infinite shape of the binarized object which is extracted from an infrared image, and can recognize the pedestrian stably is attained. Moreover, even if it cannot detect the head of a pedestrian with an easy judgment of a pedestrian's bodily features like before because the pedestrian is holding up the umbrella, and it cannot recognize a pedestrian's leg further, by judging the existence of the umbrella the pedestrian is holding up from the infrared image, the effect that the vehicle surroundings monitoring apparatus can judge precisely infinite shape of the binarized object which is extracted from an infrared image, and can recognize pedestrian stably is attained.

Moreover, particularly, when judging the existence of a pedestrian's leg, it is judged whether the binarized object 100 has a width which is suitable as a pedestrian's leg, whether the binarized object 100 has a longwise shape which is suitable as a pedestrian's leg, and further, whether the binarized object 100 exists below the perimeter region. And as a result, even when a signboard which has a shape similar to a pedestrian's leg, etc. is extracted as the binarized object 100, for example, by excepting the binarized object which is not suitable as a pedestrian's leg in the shape or the place which exists in the image, the effect that it can prevent recognizing a signboard etc., as a pedestrian's leg is attained.

Moreover, it is judged whether the binarized object 100 is a pedestrian or not, using the luminance change of the leg accompanying a walk of a pedestrian, thereby increasing the recognition accuracy, whereas, even if the pedestrian stands still and hence the pedestrian's leg cannot be detected, it is possible to recognized a pedestrian based on the existence of the umbrella the pedestrian is holding up. And as a result, it becomes possible to judge whether the object is a pedestrian or not regardless of whether the pedestrian is walking or not, thereby increasing the recognition accuracy of a pedestrian.

Moreover, particularly, when judging the existence of the umbrella the pedestrian is holding up, the existence of a pedestrian is judged by judging whether the region which is considered to be an umbrella has a width and an average luminance which are suitable as an umbrella, and whether the correlation between the position of the centroid of the binarized object which is considered to be a pedestrian and the position of the centroid of the region which is considered to be the range of the umbrella the pedestrian is holding up is a suitable spatial correlation. Thus, those which are not suitable as the umbrella the pedestrian is holding up, due to the width, average luminance, and the position thereof are excepted, thereby preventing the pedestrian from being recognized based on the umbrella which cannot be judged to be the umbrella the pedestrian is holding up, and the object other than the pedestrian.

Moreover, in a case that the surroundings of the vehicle involves rainy weather, a pedestrian is recognized from existence of the pedestrian's leg or the umbrella the pedestrian is holding up, whereas in the other case, these characteristics are not utilized to prevent the object which is neither the pedestrian's leg nor the umbrella the pedestrian is holding up from being detected when the surroundings of the vehicle does not include rainy weather, thereby increasing the recognition accuracy of a pedestrian.

It should be noted that the effect that alarm is outputted only to the object which is recognized to be a pedestrian, and further, that alarm is outputted only to a pedestrian who should be marked particularly, such as a pedestrian who is likely to come into collision with an automobile, to accentuate the existence of such a pedestrian who should be marked, thereby appealing to the driver of the vehicle more strongly can be attained.

According to the vehicle surroundings monitoring apparatus of the first aspect of the present invention, when the leg judging device judges that the binarized object is a pedestrian's leg, the pedestrian recognizing device recognizes the object which contains the binarized object as a pedestrian, thereby it is possible to recognize the pedestrian of the surroundings of vehicle from existence of a pedestrian's leg picturized by the infrared image photographing device.

Therefore, when recognizing the pedestrian of the surroundings of vehicle using an infrared image, even if a pedestrian's physical characteristics which are easily judged, such as the head of a pedestrian, is undetectable like before, by judging existence of a pedestrian's leg from an infrared image, the vehicle surroundings monitoring apparatus judges precisely infinite shape binarized object extracted from an infrared image, thereby it is possible to recognize a pedestrian stably.

According to the vehicle surroundings monitoring apparatus of the second aspect of the present invention, when the umbrella judging device judges that the umbrella the pedestrian is holding up exists in the search region above the binarized object, the pedestrian recognizing device recognizes the object which contains the binarized object to be a pedestrian, thereby it is possible to recognize a pedestrian of the surroundings of vehicle from existence of the umbrella the pedestrian is holding up picturized by the infrared image photographing device.

Therefore, when recognizing the pedestrian of the surroundings of vehicle using an infrared image, even if a pedestrian's physical characteristics which are easily judged, such as the head of a pedestrian, is undetectable because the pedestrian is holding an umbrella up, by judging existence of the umbrella the pedestrian is holding up from an infrared image, the vehicle surroundings monitoring apparatus judges precisely infinite shape binarized object extracted from an infrared image, thereby it is possible to recognize a pedestrian stably.

According to the vehicle surroundings monitoring apparatus of the third aspect of the present invention, by judging whether the binarized object has a width suitable as a pedestrian's leg, whether the binarized object has a longwise shape suitable as a pedestrian's leg, and further whether the binarized object exists below the perimeter region, it is possible to judge existence of a pedestrian.

Therefore, for example, even when a signboard having a shape similar to a pedestrian's leg, etc. is extracted as the binarized object, by excepting the binarized object which is not suitable as a pedestrian's leg because of its shape or the position thereof in a image, it is possible to prevent a signboard having a shape similar to a pedestrian's leg, etc., from being recognized as a pedestrian's leg.

According to the vehicle surroundings monitoring apparatus of the fourth aspect of the present invention, a time series luminance change by walk of a pedestrian is detected, thereby it is possible to judge whether an object is a pedestrian or not.

Therefore, since it judges whether the object is a pedestrian or not, using the luminance change of the leg accompanying a walk of the pedestrian, which had been the hindrance in recognizing a pedestrian conventionally, as a result, it is possible to increase the recognition accuracy of a pedestrian.

According to the vehicle surroundings monitoring apparatus of the fifth aspect of the present invention, when the umbrella judging device judges that the umbrella the pedestrian is holding up exists within the search region, the pedestrian recognizing device can recognize as a pedestrian the object, even when the object contains the binarized object from which a time series luminance change is not detected.

Therefore, by judging whether the object is a pedestrian or not, using the luminance change accompanying a walk of a pedestrian, it is possible to recognize a pedestrian from existence of the umbrella the pedestrian is holding up, even in the case in which the leg of a pedestrian who stands still without walking cannot be detected, conversely. And as a result, it becomes possible to judge whether the object is a pedestrian or not, regardless of walking or not walking of the pedestrian, thereby it is possible to increase the recognition accuracy of a pedestrian.

According to the vehicle surroundings monitoring apparatus of the sixth aspect of the present invention, by judging whether the binarized object contained in the integrated search region has a width and an average luminance suitable as an umbrella the pedestrian is holding up, it is possible to judge existence of a pedestrian.

Therefore, by excepting the binarized object which is not suitable as the umbrella the pedestrian is holding up because of its width and its average luminance, it becomes possible to judge exactly existence of the umbrella the pedestrian is holding up by an infrared image photographed by the infrared photographing device, thereby increasing the recognition accuracy of a pedestrian.

According to the vehicle surroundings monitoring apparatus of the seventh aspect of the present invention, by judging whether the integrated search region has a width and an average luminance which are suitable as those of the umbrella the pedestrian is holding up, and whether the spatial correlation between the centroid position of the binarized object which is considered to be a pedestrian and the centroid position of the integrated search region which is considered to be the range of the umbrella the pedestrian is holding up is a suitable spatial correlation or not, it is possible to judge the existence of a pedestrian.

Therefore, by excepting what having a width or an average luminance which are not suitable as the umbrella the pedestrian is holding up, and what having a spatial correlation which is not suitable because the centroid position of the portion which is considered to be a pedestrian is shifted from the centroid position of the portion which is considered to be the umbrella the pedestrian is holding up, it is possible to prevent recognizing a pedestrian from the existence of an umbrella or an object which cannot be judged to be the umbrella the pedestrian is holding up.

According to the vehicle surroundings monitoring apparatus of the eighth aspect of the present invention, only when the surroundings of vehicle involves rainy weather, the invention undertakes to recognize a pedestrian from the characteristics of the pedestrian when it is rainy weather.

Therefore, when the surroundings of vehicle involves rainy weather, a pedestrian is recognized from the characteristics of the pedestrian standing in rainy weather, whereas, when the surroundings of vehicle does not involve rainy weather, by not using the characteristics of the pedestrian standing in rainy weather in the other case, it is possible to prevent detecting the object which is neither the pedestrian's leg nor the umbrella the pedestrian is holding up, thereby increasing the recognition accuracy of a pedestrian.

According to the vehicle surroundings monitoring apparatus of the ninth aspect of the present invention, by outputting an alarm about a pedestrian when the object which contains the binarized object is recognized as a pedestrian by the pedestrian recognizing device, it is possible to output the alarm only regarding the object which is recognized as a pedestrian.

Therefore, it is possible to alert the driver of the vehicle for only a pedestrian, without outputting an unnecessary alarm to any objects other than a pedestrian.

According to the vehicle surroundings monitoring apparatus of the tenth aspect of the present invention, the object recognized as a pedestrian by the pedestrian recognizing device can be accentuated.

Therefore, existence of a pedestrian can be accentuated more strongly, thereby alerting the driver of the vehicle of the presence of a pedestrian.

According to the vehicle surroundings monitoring apparatus of the eleventh aspect of the present invention, the object recognized as a pedestrian by the pedestrian recognizing device can be accentuated, thereby more positively informing the driver of the situation.

Therefore, a possibility of overlooking the existence of a pedestrian displayed on the display device is eliminated to accentuate existence of a pedestrian more strongly, thereby alerting the driver of the vehicle for a pedestrian more strongly.

According to the vehicle surroundings monitoring apparatus of the twelfth aspect of the present invention, only the object which is judged to be a pedestrian whom an alarm should be outputted can be accentuated.

Therefore, without outputting an unnecessary alarm regarding any objects other than a pedestrian, even if it is a pedestrian, it is possible to alert the driver of the vehicle for only a pedestrian who should be marked particularly, for example, such as a pedestrian who has a high possibility of coming into collision with a vehicle.

According to the vehicle surroundings monitoring apparatus of the thirteenth aspect of the present invention, the object which is wanted to be accentuated can be distinguished easily.

Therefore, by making the existence of a pedestrian who should be marked distinguishable, it becomes possible to inform the driver of vehicle clearly, thereby alerting the driver of the vehicle more strongly for a pedestrian.

Although there have been described what are the present embodiments of the invention, it will be understood that modifications and variations may be made thereto within the spirit and scope of the invention, as indicated by the appended claims.

What is claimed is:

1. A vehicle surroundings monitoring apparatus, comprising:
   an infrared image photographing device for photographing a gray scale image,
   a pedestrian leg characteristic value storing device for storing a characteristic value of a leg of a pedestrian,
   a binarized object extracting device for extracting a binarized object by binarizing the gray scale image,
   a leg judging device for judging whether the binarized object is the leg of the pedestrian or not, by comparing a characteristic value of the binarized object extracted by the binarized object extracting device with the characteristic value of leg of a pedestrian, and
   a pedestrian recognizing device for recognizing an object including the binarized object as a pedestrian when the binarized object is recognized as a leg of a pedestrian by the leg judging device.

2. A vehicle surroundings monitoring apparatus, comprising:
   an infrared image photographing device for photographing a gray scale image,
   an umbrella characteristic value storing device for storing a characteristic value of an umbrella in a state held by a pedestrian,
   a binarized object extracting device for extracting a binarized object by binarizing the gray scale image,
   a perimeter region calculating device for calculating a perimeter region on the gray scale image of the binarized object extracted by the binarized object extracting device,
   a search region setting device for setting a search region between an upper end of the perimeter region calculated by the perimeter region calculating device and the binarized object,
   an umbrella judging device for judging whether an umbrella is present or not in the search region, by comparing a characteristic value of the search region set by the search region setting device with the characteristic value of the umbrella in a state held by a pedestrian, and
   a pedestrian recognizing device for recognizing an object including the binarized object as a pedestrian when it is recognized that the umbrella held by a pedestrian is present in the search region by the umbrella judging device.

3. A vehicle surroundings monitoring apparatus according to claim 1, further comprising a perimeter region calculating device for calculating a perimeter region on the gray scale image of the binarized object extracted by the binarized object extracting device, wherein the leg judging device judges that the binarized object is the leg of a pedestrian when the width of the binarized object is within a predetermined range, an aspect ratio of the binarized object is not less than a predetermined threshold, and the binarized object is present within the perimeter region of a predetermined range from a lower end of the perimeter region.

4. A vehicle surroundings monitoring apparatus according to claim 3, further comprising a luminance change detecting device for detecting whether a time series luminance change of the binarized object extracted by the binarized object extracting device is present or not, wherein the leg judging device judges that the binarized object is the leg of a pedestrian when the time series luminance change of the binarized object is detected by the luminance change detecting device.

5. A vehicle surroundings monitoring apparatus according to claim 4, further comprising:
an umbrella characteristic value storing device for storing a characteristic value of an umbrella in a state held by a pedestrian,
a search region setting device for setting a search region between the upper end of the perimeter region and the binarized object on the gray scale image of the binarized object in which a time series luminance change of the binarized object is not detected by the luminance change detecting device, and
an umbrella judging device for judging whether the umbrella is present or not within the search region by comparing the characteristic value of the search region set by the search region setting device with the characteristic value of the umbrella in a state held by a pedestrian,
wherein the pedestrian recognizing device recognizes an object which includes the binarized object as a pedestrian, when the binarized object is judged to be a leg of the pedestrian by the leg judging device, or when the umbrella held by a pedestrian is judged to be present within the search region by the umbrella judging device.

6. A vehicle surroundings monitoring apparatus according to claim 5, comprising:
two of the infrared photographing devices,
a distance calculating device for calculating distance to the binarized object included in the gray scale image, using two gray scale images photographed by the two infrared photographing devices,
a subsearch region setting device for setting subsearch regions to the left and the right of the search region, respectively,
an integrated search region setting device for setting an integrated search region, in which the search region and at least one of the subsearch regions are integrated, when the distance to the binarized object included in the search region is identical with the distance to the binarized object included in at least one of the subsearch regions,
a width measuring device for measuring width of the integrated search region set by the integrated search region setting device, and
an average luminance calculating device for calculating an average luminance of the integrated search region set by the integrated search region setting device,
wherein the umbrella judging device judges that the umbrella is present within the search region, when the width of the integrated search region is within a predetermined range and the average luminance of the integrated search region is not more than a predetermined luminance threshold.

7. A vehicle surroundings monitoring apparatus according to claim 2, comprising:
two of the infrared photographing devices,
a distance calculating device for calculating distance to the binarized object included in the gray scale image, using two gray scale images photographed by the two infrared photographing devices,
a subsearch region setting device for setting subsearch regions to the left and the right of the search region, respectively,
an integrated search region setting device for setting an integrated search region, in which the search region and at least one of the subsearch regions are integrated, when the distance to the binarized object included in the search region is identical with the distance to the binarized object included in at least one of the subsearch regions,
a width measuring device for measuring width of the integrated search region set by the integrated search region setting device, and
an average luminance calculating device for calculating an average luminance of the integrated search region set by the integrated search region setting device,
wherein the umbrella judging device judges that the umbrella is present within the search region, when the width of the integrated search region is within a predetermined range and the average luminance of the integrated search region is not more than a predetermined luminance threshold.

8. A vehicle surroundings monitoring apparatus according to claim 6, comprising:
a binarized object centroid position calculating device for calculating a centroid position of the binarized object extracted by the binarized object extracting device, and
a region centroid position calculating device for calculating a centroid position of the integrated search region set by the integrated search region setting device,
wherein the umbrella judging device judges that the umbrella is present within the search region, when the width of the integrated search region is within a predetermined range, and the average luminance of the integrated search region is not more than a predetermined luminance threshold, and further difference of position in transverse direction between the centroid of the binarized object and the centroid of the integrated search region is not more than a predetermined distance threshold.

9. A vehicle surroundings monitoring apparatus according to claim 7, comprising:
a binarized object centroid position calculating device for calculating a centroid position of the binarized object extracted by the binarized object extracting device, and
a region centroid position calculating device for calculating a centroid position of the integrated search region set by the integrated search region setting device,
wherein the umbrella judging device judges that the umbrella is present within the search region, when the width of the integrated search region is within a predetermined range, and the average luminance of the integrated search region is not more than a predetermined luminance threshold, and further difference of position in transverse direction between the centroid of the binarized object and the centroid of the integrated search region is not more than a predetermined distance threshold.

10. A vehicle surroundings monitoring apparatus according to claim 1, further comprising a rainy weather detecting device for detecting rainfall state of the vehicle surroundings, wherein the pedestrian recognizing device performs a processing of recognizing a pedestrian only when rainfall in the vehicle surroundings is detected by the rainy weather detecting device.

11. A vehicle surroundings monitoring apparatus according to claim 2, further comprising a rainy weather detecting device for detecting rainfall state of the vehicle surroundings, wherein the pedestrian recognizing device performs a processing of recognizing a pedestrian only when rainfall in the vehicle surroundings is detected by the rainy weather detecting device.

12. A vehicle surroundings monitoring apparatus according to claim 1, further comprising an alarm outputting device for outputting an alarm about a pedestrian when the pedestrian recognizing device recognizes the object including the binarized object as a pedestrian.

13. A vehicle surroundings monitoring apparatus according to claim 2, further comprising an alarm outputting device for outputting an alarm about a pedestrian when the pedestrian recognizing device recognizes the object including the binarized object as a pedestrian.

14. A vehicle surroundings monitoring apparatus according to claim 12, further comprising a displaying device for displaying the surroundings of a vehicle photographed by the infrared photographing device, wherein the alarm outputting device displays the object which is recognized as a pedestrian by the pedestrian recognizing device and an object which is not recognized as a pedestrian by the pedestrian recognizing device distinguishably from each other on the displaying device.

15. A vehicle surroundings monitoring apparatus according to claim 13, further comprising a displaying device for displaying the circumference surroundings of a vehicle photographed by the infrared photographing device, wherein the alarm outputting device displays the object which is recognized as a pedestrian by the pedestrian recognizing device and an object which is not recognized as a pedestrian by the pedestrian recognizing device distinguishably from each other on the displaying device.

16. A vehicle surroundings monitoring apparatus according to claim 14, wherein the alarm outputting device outputs an audible warning while displaying the object which is recognized as a pedestrian by the pedestrian recognizing device and the object which is not recognized as a pedestrian by the pedestrian recognizing device distinguishably from each other on the displaying device.

17. A vehicle surroundings monitoring apparatus according to claim 15, wherein the alarm outputting device outputs an audible warning while displaying the object which is recognized as a pedestrian by the pedestrian recognizing device and the object which is not recognized as a pedestrian by the pedestrian recognizing device distinguishably from each other on the displaying device.

18. A vehicle surroundings monitoring apparatus according to claim 14, further comprising an alarm judging device for judging whether a pedestrian is a subject to which alarm should be outputted or not, when the pedestrian recognizing device recognizes the object including the binarized object as a pedestrian, wherein the alarm outputting device displays the object which is judged to be a pedestrian to which alarm should be outputted by the alarm judging device and the object which is not judged to be a pedestrian to which alarm should be outputted by the alarm judging device, distinguishably from each other on the displaying device.

19. A vehicle surroundings monitoring apparatus according to claim 15, further comprising an alarm judging device for judging whether a pedestrian is a subject to which alarm should be outputted or not, when the pedestrian recognizing device recognizes the object including the binarized object as a pedestrian, wherein the alarm outputting device displays the object which is judged to be a pedestrian to which alarm should be outputted by the alarm judging device and the object which is not judged to be a pedestrian to which alarm should be outputted by the alarm judging device, distinguishably from each other on the displaying device.

20. A vehicle surroundings monitoring apparatus according to claim 14, wherein the alarm outputting device intensively displays the object which is recognized as a pedestrian by the pedestrian recognizing device when the alarm outputting device displays the object distinguishably on the displaying device.

21. A vehicle surroundings monitoring apparatus according to claim 15, wherein the alarm outputting device intensively displays the object which is recognized as a pedestrian by the pedestrian recognizing device when the alarm outputting device displays the object distinguishably on the displaying device.

* * * * *